US007027653B2

(12) United States Patent
Hino et al.

(10) Patent No.: US 7,027,653 B2
(45) Date of Patent: Apr. 11, 2006

(54) VARIATION DETECTING APPARATUS, VARIATION DETECTING METHOD, AND STORAGE MEDIUM AND SYSTEM FOR STORING PROGRAM INVOLVED IN THE METHOD

(75) Inventors: Takashi Hino, Yokohama (JP); Koichi Moriguchi, Yokohama (JP); Takatoshi Kodaira, Yokohama (JP); Fuminobu Komura, Yokohama (JP)

(73) Assignee: Hitachi Software Engineering Co., Ltd., Yokohama (JP)

( * ) Notice: Subject to any disclaimer, the term of this patent is extended or adjusted under 35 U.S.C. 154(b) by 761 days.

(21) Appl. No.: 09/986,131

(22) Filed: Nov. 7, 2001

(65) Prior Publication Data
US 2002/0060734 A1 May 23, 2002

(30) Foreign Application Priority Data
Nov. 9, 2000 (JP) .............................. 2000-342713
May 11, 2001 (JP) .............................. 2001-141922

(51) Int. Cl.
*G06K 9/68* (2006.01)
(52) U.S. Cl. .................... 382/218; 340/907; 340/908.1; 340/919; 340/933; 340/995.1; 342/52; 342/64; 342/70; 342/71; 342/457; 382/104; 382/113; 382/165; 382/199; 382/294; 701/10; 701/117; 701/207; 701/208
(58) Field of Classification Search ................ 348/152, 348/153, 155; 382/113, 165, 192, 197, 199, 382/203, 218, 241, 242, 294
See application file for complete search history.

(56) References Cited

U.S. PATENT DOCUMENTS

| 5,798,787 | A  | * | 8/1998 | Yamaguchi et al. | 348/152 |
| 5,864,632 | A  | * | 1/1999 | Ogawa et al. | 382/113 |
| 6,288,676 | B1 | * | 9/2001 | Maloney | 342/457 |
| 6,523,024 | B1 | * | 2/2003 | Yajima et al. | 707/3 |
| 6,546,118 | B1 | * | 4/2003 | Iisaka et al. | 382/104 |
| 6,590,521 | B1 | * | 7/2003 | Saka et al. | 342/70 |
| 6,665,439 | B1 | * | 12/2003 | Takahashi | 382/199 |
| 6,714,664 | B1 | * | 3/2004 | Kambe et al. | 382/113 |
| 6,725,154 | B1 | * | 4/2004 | Kamikawa et al. | 701/208 |
| 6,813,370 | B1 | * | 11/2004 | Arai | 382/104 |

* cited by examiner

Primary Examiner—Bhavesh M. Mehta
Assistant Examiner—Gregory Desire
(74) Attorney, Agent, or Firm—Crowell & Moring LLP

(57) ABSTRACT

In the case where variations in ground objects in one and the same area are detected between a line drawing map describing profile lines of the ground objects or a reference line drawing/image obtained by picking up the ground objects from above, and a target image obtained by picking up the ground objects in the same area from above later on, a variation detecting apparatus collates the reference line drawing/image with the target image so as to obtain variation indexes indicating whether there are variations or not in the ground objects respectively, and displays ground objects which can be judged to have variations or ground objects which cannot be judged as to whether there are variations or not on the basis of the variation indexes, in a display mode in which an area of the reference line drawing/image including the ground objects and an area of the target image including the ground objects can be compared with each other. Accordingly, confirmation or update of variations of ground objects on a line drawing map can be coped with easily, and portions having variations can be selectively displayed so that portions where variation detection should be confirmed can be understood intuitively.

27 Claims, 14 Drawing Sheets

SCREEN EXAMPLE ON USER TERMINAL SIDE — 1601

RANGE DESIGNATION IN LATITUDE AND LONGITUDE

LATITUDE RANGE: 35° 12' 34" ~ 35° 34' 56"

LONGITUDE RANGE: 140° 23' 45" ~ 140° 43' 21"

— 1602

DESIGNATION OF PLACE NAME

PREFECTURE NAME: KANAGAWA PREFECTURE

CITY/WARD/TOWN/VILLAGE NAME: YOKOHAMA CITY NAKA KU

SECTION/STREET: ONOUE CHOU 6 CHOU-ME

BLOCK: 71

DESIGNATE RANGE ON MAP

LATITUDE 35° 12'34" — 35° 34'56"
LONGITUDE 140° 23'45" — 140° 43'21"

VARIATION DETECTING APPARATUS, VARIATION DETECTING METHOD, AND STORAGE MEDIUM AND SYSTEM FOR STORING PROGRAM INVOLVED IN THE METHOD

BACKGROUND OF THE INVENTION

1. Field of the Invention

The present invention relates to a technique for detecting variations in an image processing apparatus for dealing with line drawing map data or image data of an aerial photograph, a satellite photograph, or the like.

2. Description of the Related Art

Conventionally, some techniques relating to detection of variations in map and image data are known, for example, as disclosed in JP-A-11-328378, JP-A-5-181411, and so on.

According to the technique disclosed in JP-A-11-328378, a plan or three-dimensional digital map and a static image picked up from an area are used. The digital map is coordinate-converted into an image, and collated with the static image. Thus, heights of buildings, attribute information of ground objects, and so on, are detected so that the map is updated.

According to the technique disclosed in JP-A-5-181411, a central projection map is made up from a three-dimensional digital map, and collated with an aerial photograph image. Thus, variations over time or landscape information are extracted so that map information is updated automatically.

Each of the techniques disclosed in JP-A-11-328378 and JP-A-5-181411 is aimed at collating a line drawing map with an image to thereby update a detection result automatically. However, from a practical standpoint about a problem of accuracy in the detection result, there appear portions which can be updated automatically on the basis of a detection result and portions which cannot be updated automatically because of an ambiguous detection result. In the above-mentioned techniques, the latter portions are not taken into consideration so that there is a problem that a wrong detection result may be imported as it is.

SUMMARY OF THE PRESENT INVENTION

It is an object of the present invention to provide a variation detecting apparatus, a variation detecting method and a variation detecting system, in which an ambiguous detection result which cannot be updated automatically is combined with assistance based on human judgement so that confirmation or update of variations of ground objects on a line drawing map can be coped with easily, and portions having variations can be selectively displayed so that portions where variation detection should be confirmed can be understood intuitively.

In order to achieve the above object, according to the present invention, there is provided a variation detecting apparatus for detecting variations in ground objects in one and the same area between a line drawing map describing profile lines of the ground objects or an image obtained by picking up the ground objects from above (hereinafter referred to as "reference line drawing/image") and an image obtained by picking up the ground objects in the same area from above later on (hereinafter referred to as "target image"), comprising: means for collating the reference line drawing/image with the target image so as to obtain variation indexes indicating whether there are variations or not in the ground objects respectively; and means for displaying ground objects which can be judged to have variations or ground objects which cannot be judged as to whether there are variations or not on the basis of the variation indexes, in a display mode in which an area of the reference line drawing/image including the ground objects and an area of the target image including the ground objects can be compared with each other.

For example, the variation indexes are probabilities with which it can be concluded that there are variations, and probabilities with which it can be concluded that there is no variation; and ground objects in which the probabilities with which it can be concluded that there are variations are not lower than a predetermined value are regarded as ground objects which can be judged to have variations, while ground objects in which the probabilities with which it can be concluded that there are variations are not higher than a predetermined value or ground objects in which the probabilities with which it can be concluded that there is no variation are not higher than a predetermined value are regarded as ground objects which cannot be judged as to whether there are variations or not.

In the display mode in which an area of the reference line drawing/image including the ground objects and an area of the target image including the ground objects can be compared with each other, the areas are displayed in overlap with each other or placed adjacently to each other.

For example, the present invention is attained by an apparatus having means for reading line drawing map data from a line drawing data storage unit; means for reading image data from an image data storage unit; means for collating the line drawing map data with the image data by use of a processing unit; means for displaying a detection result thereof on a display unit; means for making a confirmation operation of the detection result through an input unit; means for storing and filing the detection result or the confirmation result in a result storage unit; means for reading the detection result or the confirmation result from the result storage unit; means for outputting the detection result or the confirmation result through an output unit; and means for distributing and transmitting the detection result or the confirmation result to the Internet or an intranet through a network unit.

Further, the present invention has a feature that all of targets to be confirmed are called out easily without any omission in the following manner when a detection result is to be confirmed. That is, one does not have to search targets to be confirmed for detection of variations from all the detection range. All of building may be optionally displayed. All of buildings having variations may be optionally displayed. All of buildings having probability of variations may be optionally displayed. All of buildings having probability of no variation may be optionally displayed. Such display patterns may be combined, and such targets may be displayed sequentially on a screen one by one or plurality by plurality.

In addition, the present invention has a feature that a human operation of confirmation can be facilitated in the following manner. That is, when a detection result is to be confirmed, a line drawing map and an image may be displayed in overlap with each other or placed adjacently to each other on a display unit. When the line drawing map and the image are displayed in overlap with each other, the display content may be switched; the display sequence may be changed; the transparent state may be changed; the display area where the line drawing map and the image are overlapped with each other may be made variable in one axial direction or in two axial directions; or only one of the line drawing map and the image may be scrolled. When the line drawing map and the image are displayed in overlap with each other or placed adjacently to each other, the tone, the brightness, or the like, of the line drawing map or the image may be changed; the display contents may be scrolled in the same direction by the same moving distance at the same time; the display contents may be rotated; or the display range may be scaled up/down.

In addition, the present invention has a feature that a center apparatus is provided so that variations of ground objects can be detected by use of a client computer such as a personal computer or the like. The center apparatus includes a first storage unit for storing a reference line drawing/image and a target image; a second storage unit for storing a processing program for detecting variations of ground objects; means for providing one or both of the reference line drawing/image and the target image stored in the first storage unit to a variation detecting apparatus issuing a request, on a communication line or through a medium in response to the request issued by the variation detecting apparatus; and means for providing the processing program stored in the second storage unit to the variation detecting apparatus issuing a request, on a communication line or through a medium in response to the request issued by the variation detecting apparatus. The reference line drawing/image, the target image and the processing program are provided from the center apparatus to the variation detecting apparatus constituted by a personal computer or the like. The variations of the ground objects are detected in the variation detecting apparatus receiving those images and program.

In addition, the present invention has a feature that accounting of a use fee defined for each image or a use fee defined for the processing program is made whenever any one of the reference line drawing/image, the target image and the processing program is provided.

In addition, the present invention has a feature that when a reference line drawing/image updated in the variation detecting apparatus is provided to the center apparatus, a reward corresponding to the update fee is paid.

DETAILED DESCRIPTION OF THE PREFERRED EMBODIMENTS

An embodiment according to the present invention will be described below specifically with reference to the drawings.

Figure 1:
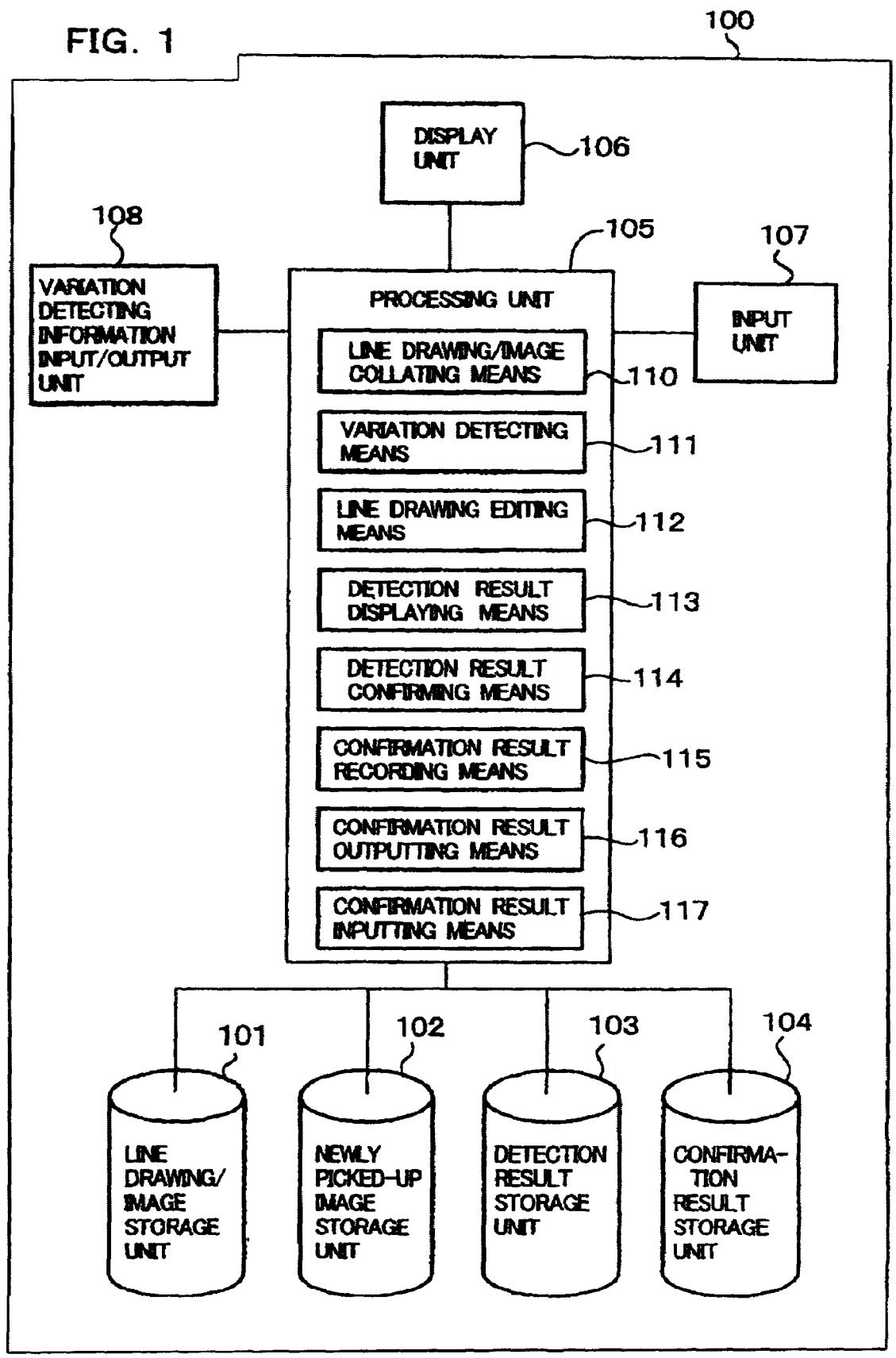
FIG. 1 is a block diagram showing a schematic functional configuration of a variation detecting apparatus according to an embodiment of the present invention.

FIG. 1 is a functional configuration example of a variation detecting apparatus according to the embodiment of the present invention. A variation detecting apparatus 100 is constituted by a line drawing/image storage unit 101, a newly picked-up image storage unit 102, a detection result storage unit 103, a confirmation result storage unit 104, a processing unit 105, a display unit 106, an input unit 107 and a variation detecting information input/output unit 108.

The line drawing/image storage unit 101 stores line drawing maps for describing profile lines of reference ground objects such as buildings or streets, or mono images or stereo pair images (three-dimensional images) which are obtained by picking up the ground objects, from above the sites where the ground objects are located. Newly picked-up image storage unit 102 stores image data of targets to be variation-detected. The image data of targets to be variation-detected are mono images or stereo pair images which obtained by picking up the ground objects from above the same ranges (regions), however, at a point of time after the image information stored in the line drawing/image storage unit 101 as the original data for creating reference line drawing maps is acquired or after the images for the image information are obtained by picking up.

In the processing unit 105, each of reference line drawing maps or images is read from the line drawing/image storage unit 101 by a line drawing/image collating means 110, and corresponding one of images as a variation detecting target is read from the newly picked-up image storage unit 102, so that the read reference drawing line map or image is collated with the image as the variation detecting target. After the collation, a variation detecting means 111 executes a variation detecting process. The detection result obtained by the variation detecting means 111 is stored in the detection result storage unit 103. The detection result stored in the detection result storage unit 103 is read, by a detection result displaying means 113, together with the reference image stored in the line drawing/image storage unit 101 correspondingly to the detection result and the image stored as the variation detecting target in the newly picked-up image storage unit 102 correspondingly to the detection result. Then, the detection result together with the above-mentioned two kinds of images is displayed on the display unit 106. At the time of displaying, display can be made in a mode in which the operator can easily judge whether a variation is present or not, such as an overlap display mode, an adjacent display mode, or the like.

While referring to the line drawing map or image displayed on the display unit 106, the operator may carry out a confirmation operation through the input unit 107 and confirm variation detection by use of a detection result confirming means 114. Information about the confirmation result or the like is stored in the confirmation result storage unit 104 by a confirmation result recording means 115. Information about the reference line drawing or image, the image as the target to be detected, the detection result, the confirmation result and so on is read from the storage units 101 to 104 by a confirmation result outputting means 116, so as to be printed out, outputted to a recording medium, network-distributed to the Internet or the like, or transmitted to a portable terminal, through the variation detecting information input/output unit 108. Further, on the basis of the detection result or confirmation result generated in this apparatus, a result reflecting the real situation after on-the-spot investigation is made is inputted from the variation detecting information input/output unit 108 through a confirmation result inputting means 117 and stored in the confirmation result storage unit 104.

Figure 2:
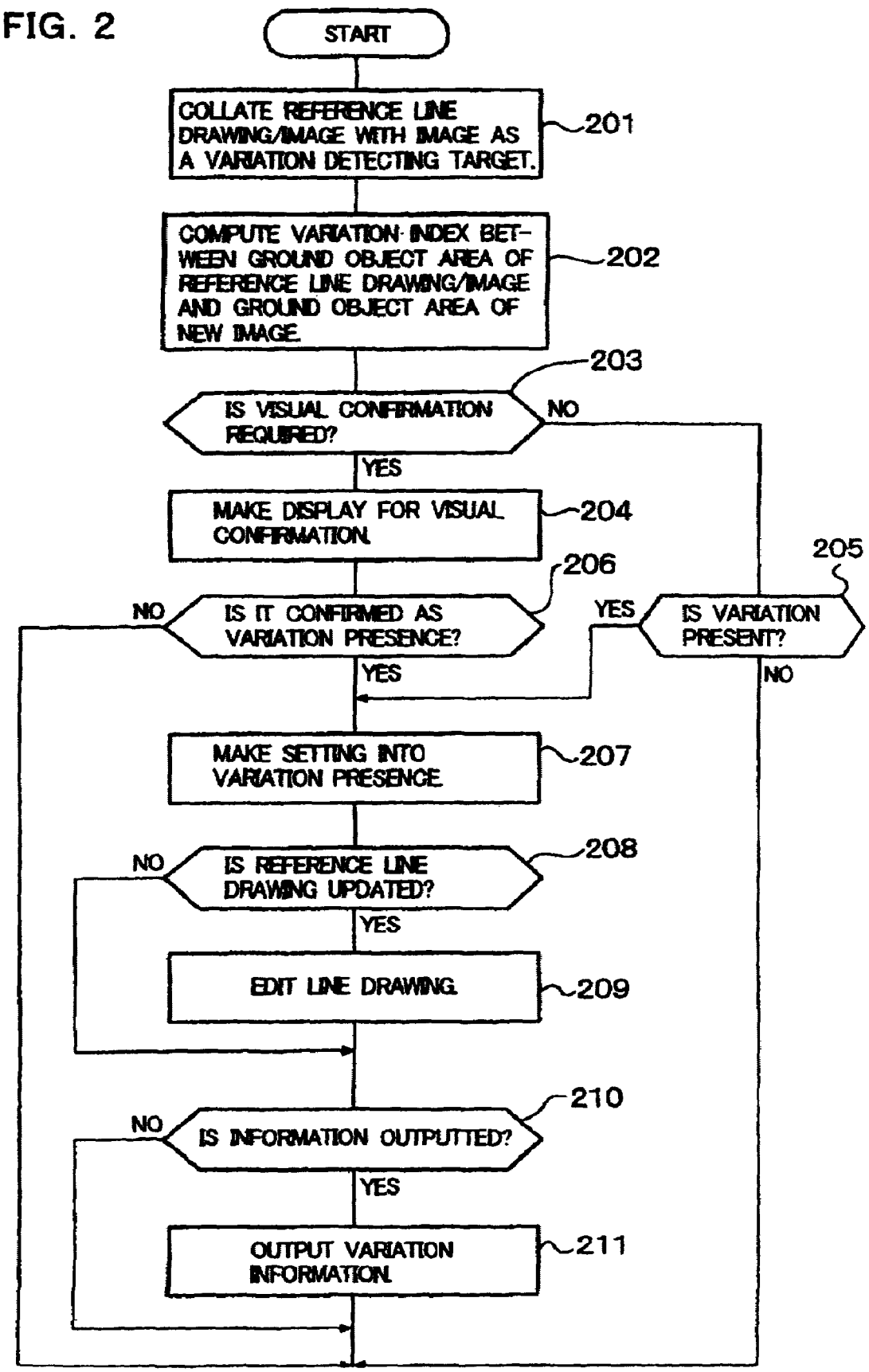
FIG. 2 is a flow chart showing a processing procedure of the variation detecting apparatus.

FIG. 2 is a flow chart showing a processing procedure of the variation detecting apparatus 100. In Step 201, a reference line drawing or image and a picked-up image as a variation detecting target are read so as to be collated with each other by the line drawing/image collating means 110. For example, the reference line drawing may be information into which an urban planning map or the like possessed by a local government is read by a scanner and vector-converted, or electronically digital map information possessed by a map data supply company or the like, or map information possessed by a public corporation such as a telephone corporation or an electrical power corporation. Alternatively, the reference line drawing may be an aerial photograph or a satellite image. An image as a variation detecting target is picked up in the same region from the sky at a point of time after the original image information for creating the reference line drawing is acquired or after the image for the image information is picked up. Such an image may be, for example, an aerial photograph or a satellite image. As preparation for detecting a variation between these two kinds of information, adjustment such as alignment, rotation, scale reduction, and so on, and collation are carried out. Any one of the methods known in the related art such as the three-dimensional convolution interpolation method, the rubber sheeting method, the projection conversion method, and so on, may be carried out as the collating method.

Figure 3:
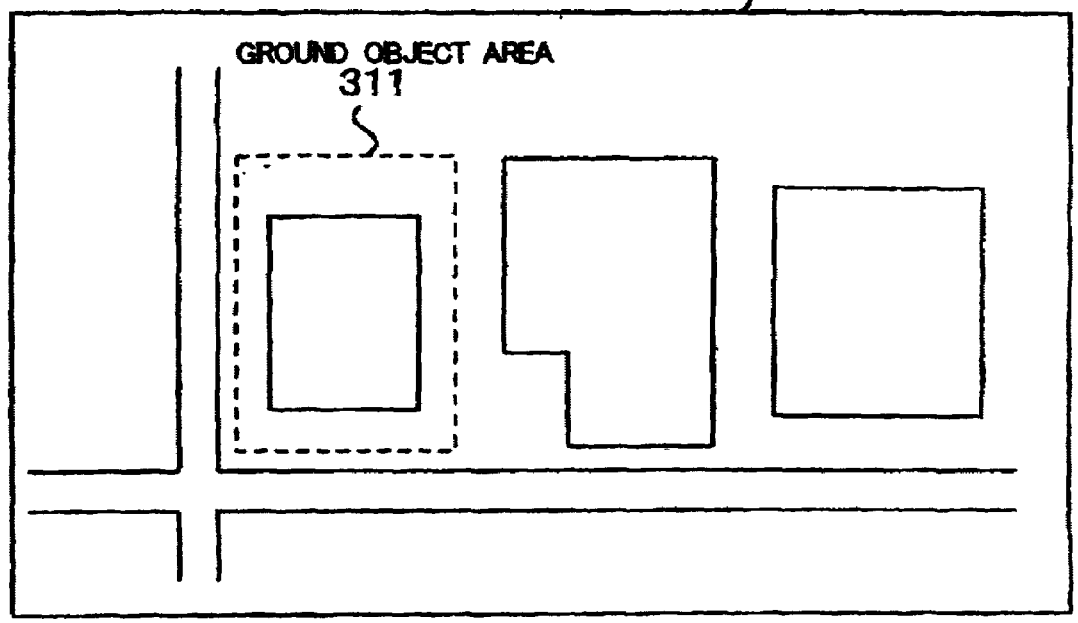
FIG. 3 is diagrams for explaining a ground object area.
Figure 3:
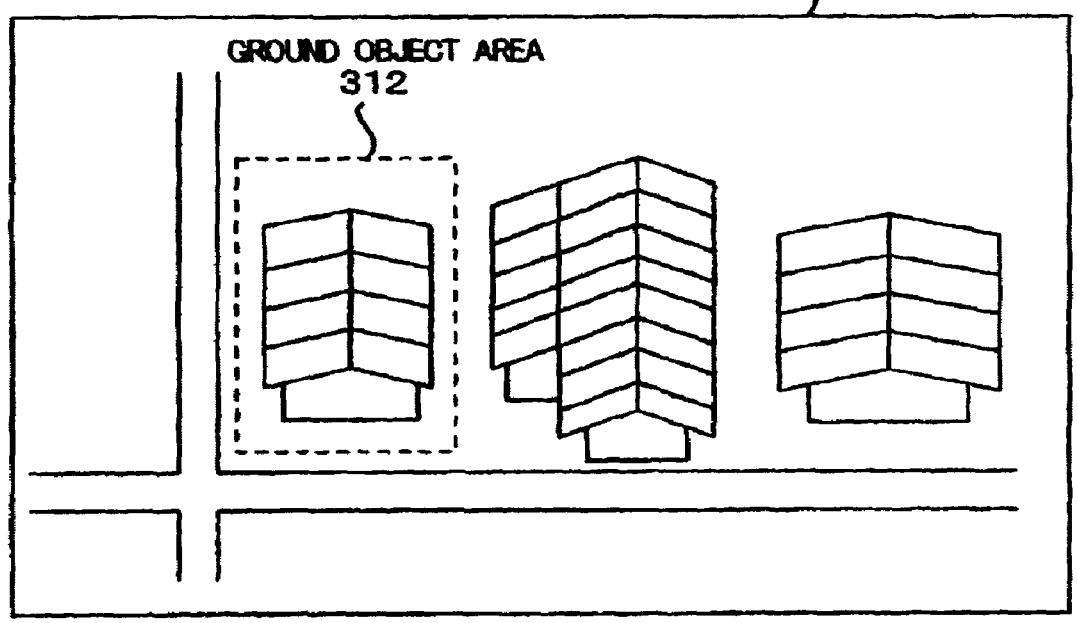

In Step 202, a variation index between a predetermined ground object area on the reference line drawing/image and a corresponding predetermined ground object area on the new image, which are collated with each other in Step 201, is computed by the variation detecting means 111. FIG. 3 shows an example of such a ground object area. On a reference line drawing map 301, a ground object area 311 is provided. On a newly picked-up image 302 as a variation detecting target, a ground object area 312 is provided.

"Variation index" indicates a variation degree between a ground object area of a reference line drawing/image and a ground object area of a new image at the same location. This term is used to express a probability or the like that these two ground object areas are coincident with each other. For example, the variation index is evaluated by means of an evaluation function, a correlation degree function, or the like, which is established between attribute information of the ground object given from the reference line drawing such as shape, classification, height, width and so on, and the image information obtained from the new image at the same location. The evaluation can be made by any one of the known techniques, so that no further deep description will be made here. For example, a technique disclosed in JP-A-11328378 can be used to make such evaluation.

In Step 203, on the basis of the variation index obtained in Step 202, judgment is made as to whether visual confirmation for the ground object area is required or not. If the variation index between the ground object areas indicates a situation of conclusion which can be made that no variation between the ground object areas is present, visual confirmation for variation or updating is not required so that the routine of process goes to Step 205. On the other hand, if the variation index between the ground object areas indicates a situation of conclusion which can be made that a variation between the ground object areas is present, visual confirmation for variation is not required so that the routine of process goes to Step 205. However, in this case, visual confirmation for updating is required. Further, if the variation index between the ground object areas indicates a situation of conclusion which cannot be made that a variation between the ground object areas is present, or if the variation index between the ground object areas indicates a situation of conclusion which cannot be made that no variation between the ground object areas is present, the detection result is ambiguous, which means visual confirmation for variation is required. Accordingly, the routine of process goes to Step 204. These conclusions may be made, for example, on the basis of a probability of conclusion which can be made that a variation is present, and a probability of conclusion which can be made that no variation is present, after these two probabilities are obtained. If the probability of conclusion which can be made that a variation is present is not smaller than a predetermined value, it indicates a situation of conclusion which can be made that a variation is present. If the probability of conclusion which can be made that no variation is present is not smaller than a predetermined value, it indicates a situation of conclusion which can be made that no variation is present. If the probability of conclusion which can be made that a variation is present is not larger than a predetermined value, or if the probability of conclusion which can be made that no variation is present is not larger than a predetermined value, it indicates a situation of a requirement for visual confirmation due to the ambiguous detection result.

In Step 204, display for visual confirmation is made by the detection result displaying means 113. On the visual confirmation display, the ground object areas concluded with a requirement for visual confirmation in Step 203 are displayed as display targets in any one of various modes in which the operator can easily judge whether a variation is present or not.

Figure 4:
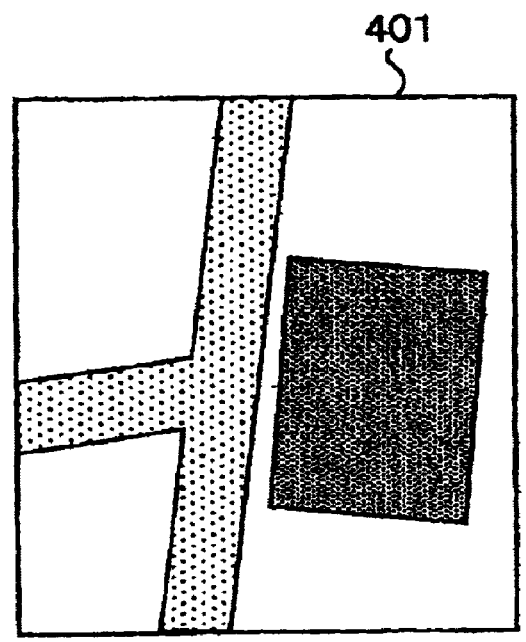
FIG. 4 is a diagram showing an example of overlap display between a line drawing and an image.
Figure 5:
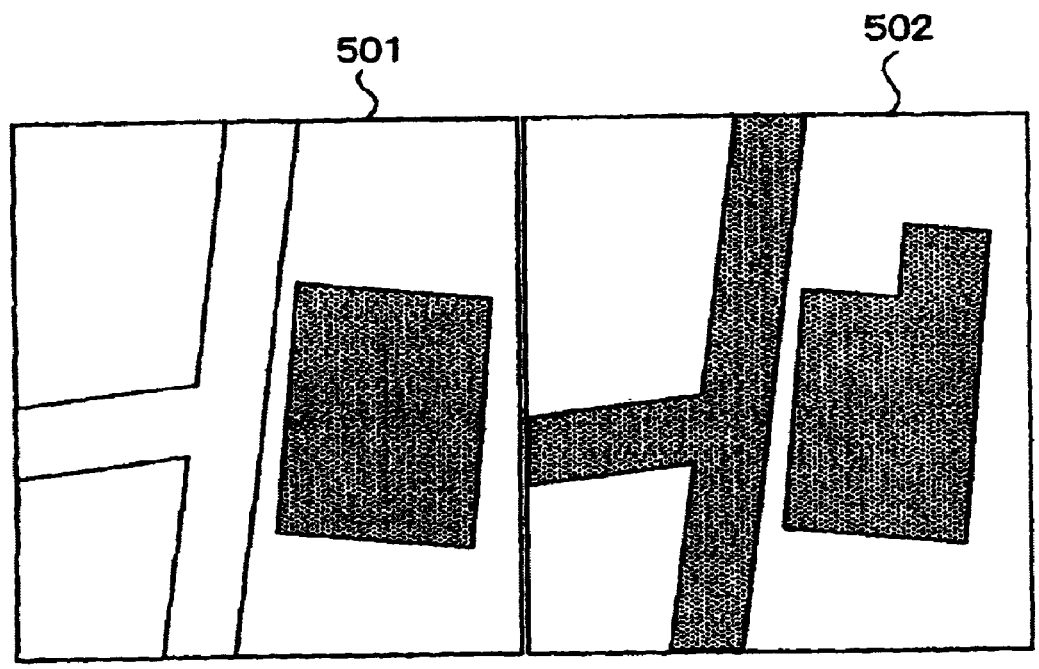
FIG. 5 is a diagram showing an example of adjacent display between the line drawing and the image.

Display modes for visual confirmation will be described below. FIG. 4 shows an example of overlap display. FIG. 5 shows an example of adjacent display. In the adjacent display of FIG. 5, a display area including a reference ground object area (hereinafter, referred to as "reference display area") 501 and a display area including a ground object area as a variation detecting target (hereinafter, referred to as "detection target display area") 502 are displayed side by side so as to make the operator conclude whether a variation between the two ground object areas is present or not. FIG. 4 is a view of display shown by overlapping the reference display area 501 and detection target display area 502 in FIG. 5 with each other. Further, in the overlap display, the display content (for example, which one of the reference display area and the detection target display area is located in the upper side so as to make these two areas overlap with each other, which one of the line drawing and the image is displayed in the reference display area, or the like) can be switched, the period of the switching can be altered manually, the display sequence can be altered, and the transparent state can be altered, by the detection result confirming means 114.

Figure 6:
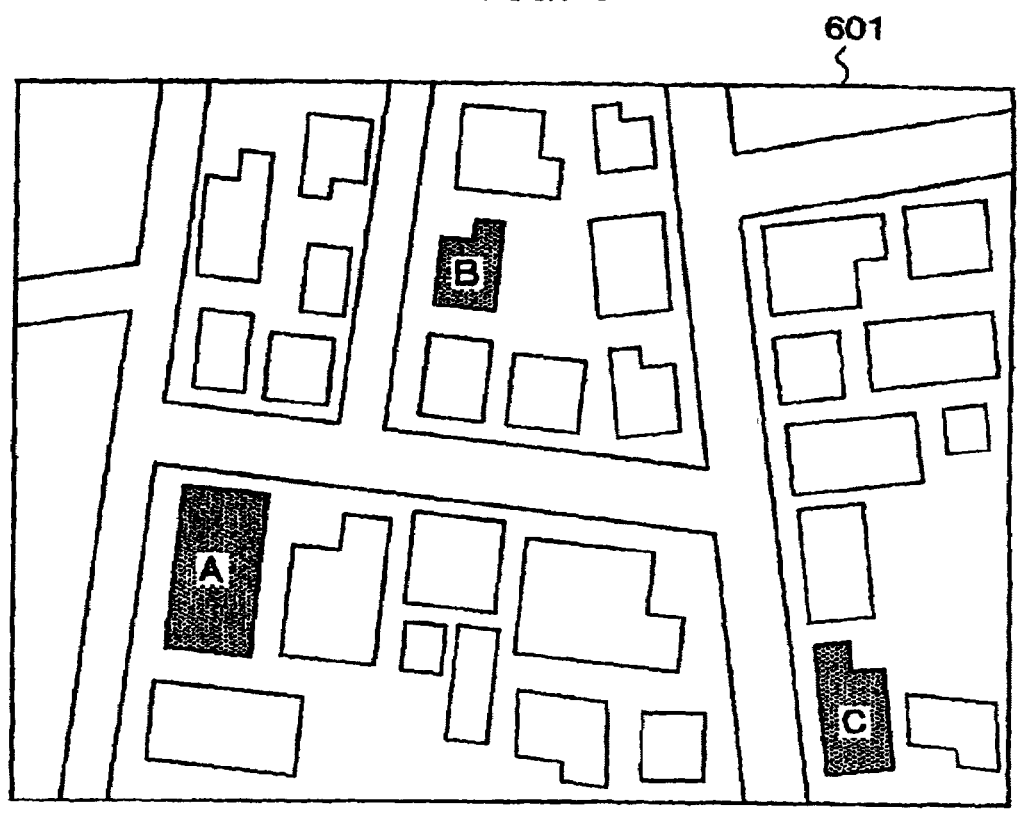
FIG. 6 is a diagram for explaining a display for visual confirmation.
Figure 6:

FIG. 6 is a view showing a display example of the ground object areas each concluded with a requirement for visual confirmation in Step 203. In FIG. 6, the whole area 601 including a plurality of ground object areas each concluded with a requirement for visual confirmation is displayed. A display mode for ground object areas A, B and C as the visual confirmation targets can be altered so as to make the ground object areas A, B and C conspicuous. For example, the ground object areas A, B and C are displayed in a different color or displayed blinking. When the operator clicks one of those ground object areas with a mouse or the like so as to select the ground object area, display may be made as shown in FIG. 4 or 5.

Figure 7:
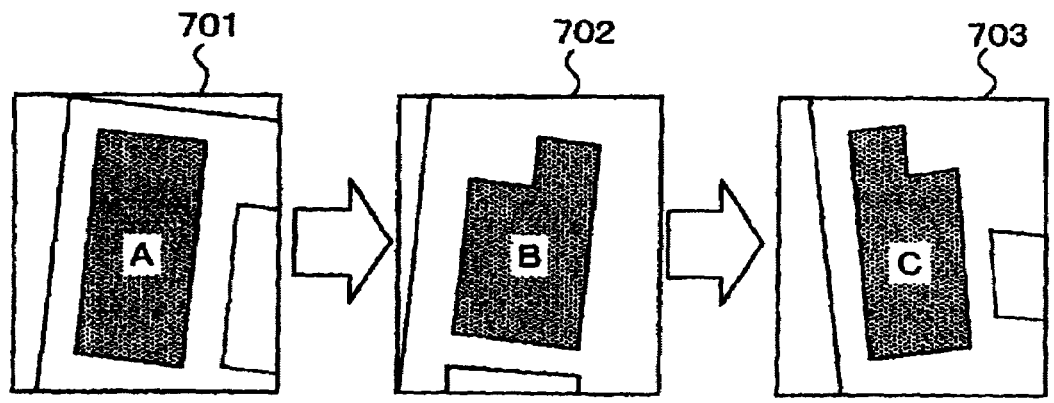
FIG. 7 is diagrams showing a sequence for carrying out the visual confirmation.

In the case where there are a plurality of ground object areas each concluded with a requirement for visual confirmation as shown in FIG. 6, displaying of display areas including the concerned ground object areas one by one sequentially or displaying of a plurality of display areas including the concerned ground object areas at one time may be made automatically or manually by a predetermined operation, as shown in FIG. 7. In FIG. 7, a display area 701 is displayed first, then a display area 702 is displayed after a predetermined time or by a manual operation, and at last, a display area 703 is displayed in the same manner as that in the display area 702. In such a manner, people do not have to search the ground object areas detected as variation presence from the output diagrams or the output screens of the detection results so that confirmation works can be advanced efficiently and comprehensively.

Figure 8:
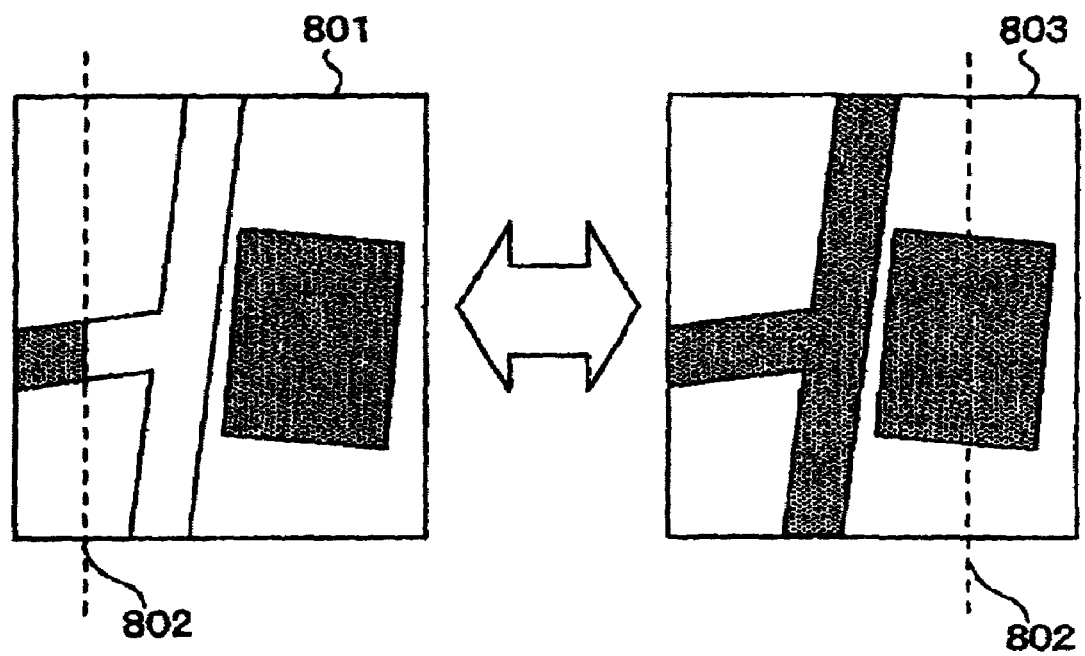
FIG. 8 is diagrams showing an example of an overlap display range changeable in any one axial direction.
Figure 9:
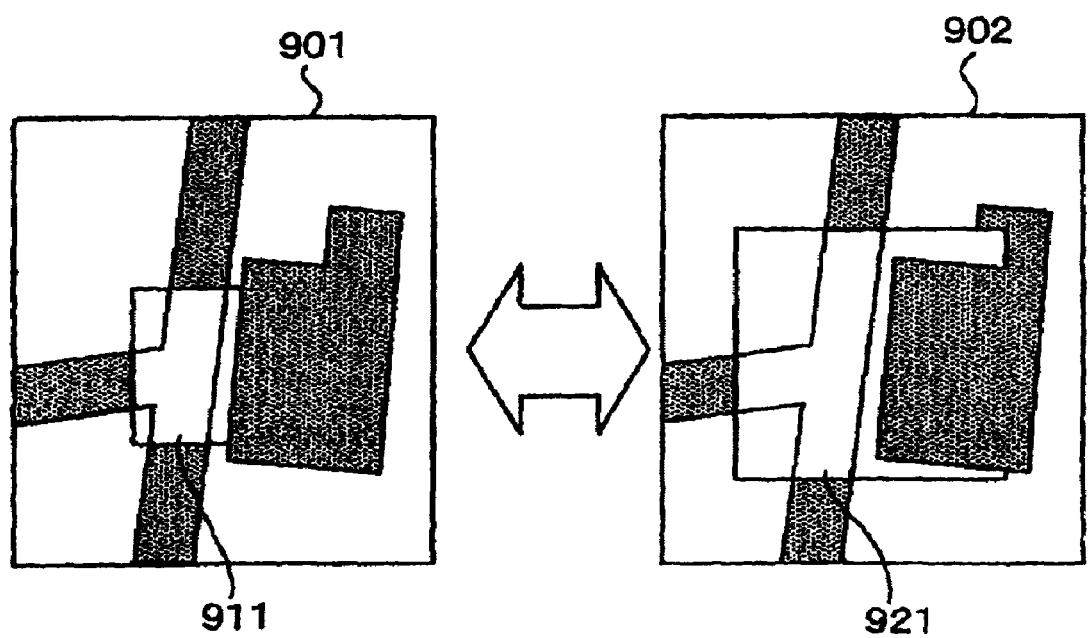
FIG. 9 is diagrams showing an example of the overlap display range changeable in any two axial directions.

FIG. 8 and FIG. 9 are views showing modifications for the overlap display of FIG. 4. FIG. 8 is an example in which, in the overlap display shown in FIG. 4, the display range can be changed in any one axial direction. In a display area 801, an axis 802 is defined so that a reference display area is displayed on the left side of the axis 802, while a detection target display area is displayed on the right side of the axis 802. The operator can drag a mouse so as to move the axis 802 horizontally. Alternatively, setting may be made such that the axis 802 is moved automatically at a predetermined speed (this speed may be set to be designated by the operator). FIG. 9 is an example in which, in the overlap display of FIG. 4, the display range can be changed in any two axial directions. In a display area 901, a box 911 is defined by a vertical axis and a horizontal axis so that a reference display area is displayed outside the box 911 while the detection target display area is displayed inside the box 911. The operator can drag the mouse so as to scale up/down the box 911 while fixing the center of the box 911. Further, scaling may be made automatically at a predetermined speed (the speed may be set to be designated by the operator).

In the display in FIG. 4 or 5, the display contents can be scrolled or rotated, or the display ranges can be scaled up/down by the same moving distance, in the same direction and at the same time. Such a process can be carried out automatically every specific time or manually. When the process is carried out automatically, the period of the process can be altered manually.

Figure 10:
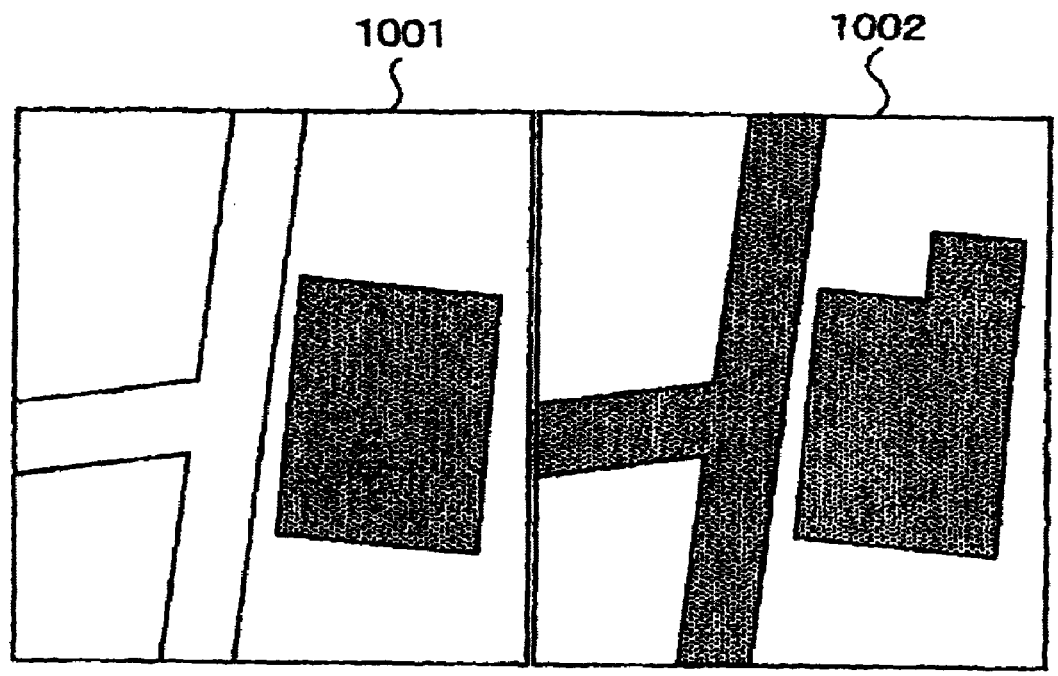
FIG. 10 is diagrams showing an example of adjacent display scrolled by the same distance in the same direction.
Figure 10:
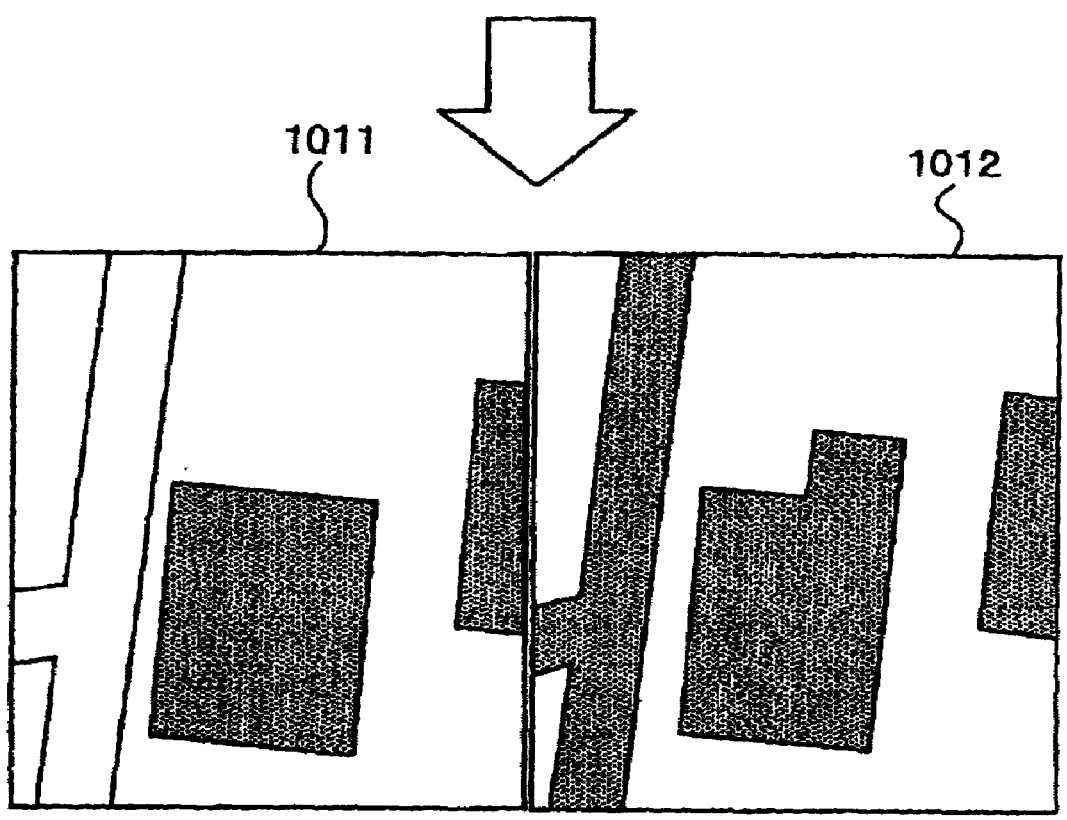
Figure 11:
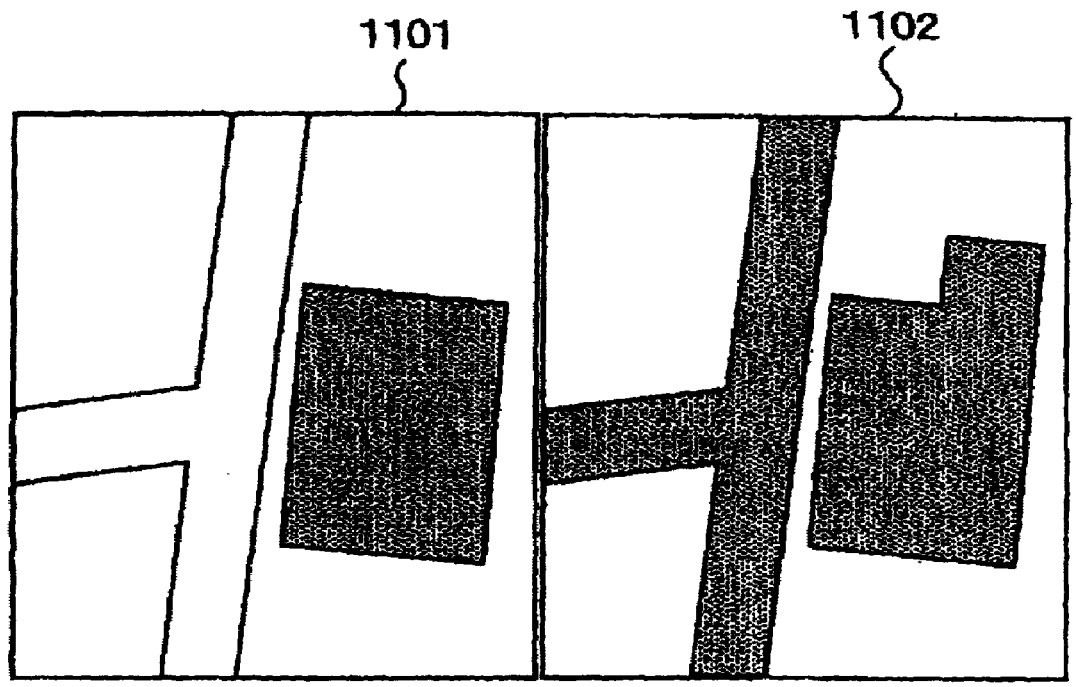
FIG. 11 is diagrams showing an example of adjacent display having the display contents rotated.
Figure 11:
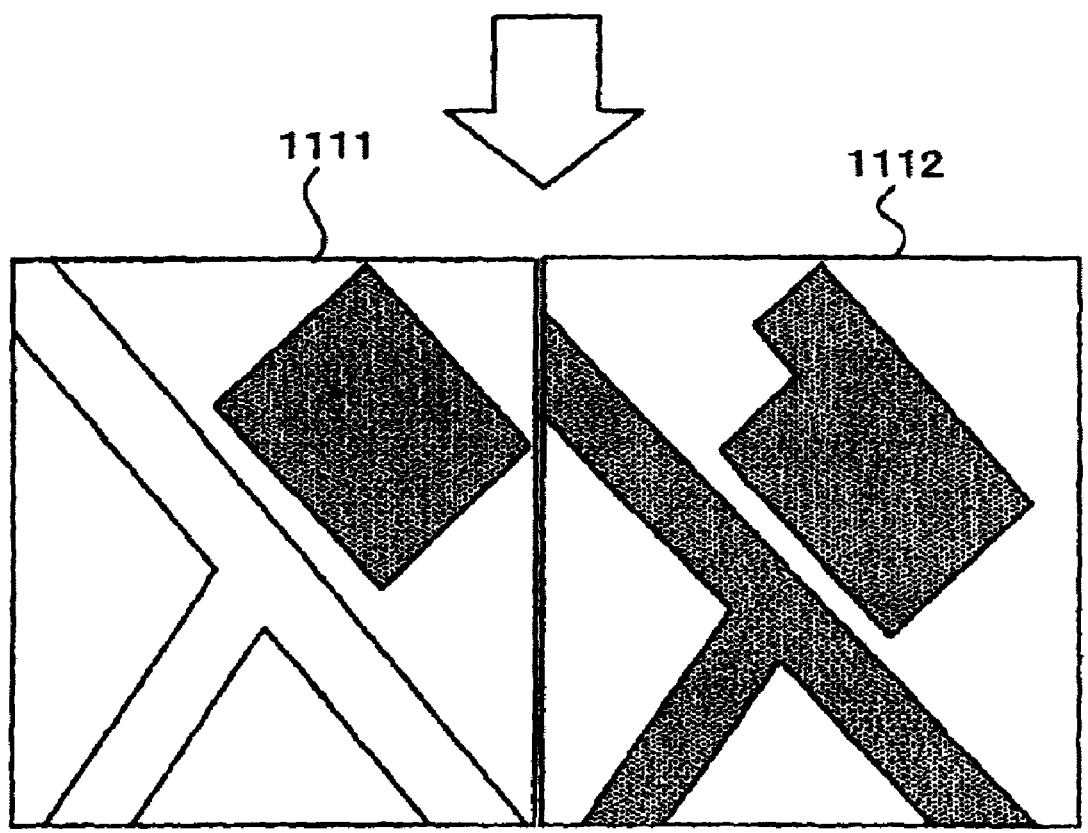
Figure 12:
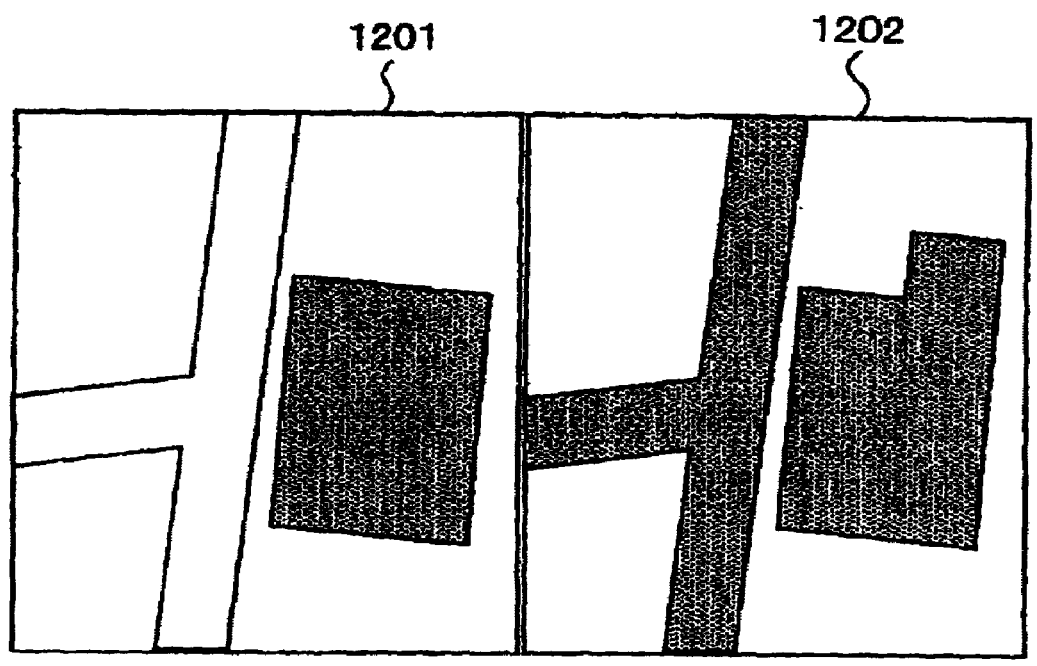
FIG. 12 is diagrams showing an example of adjacent display having the display contents scaled up.
Figure 12:
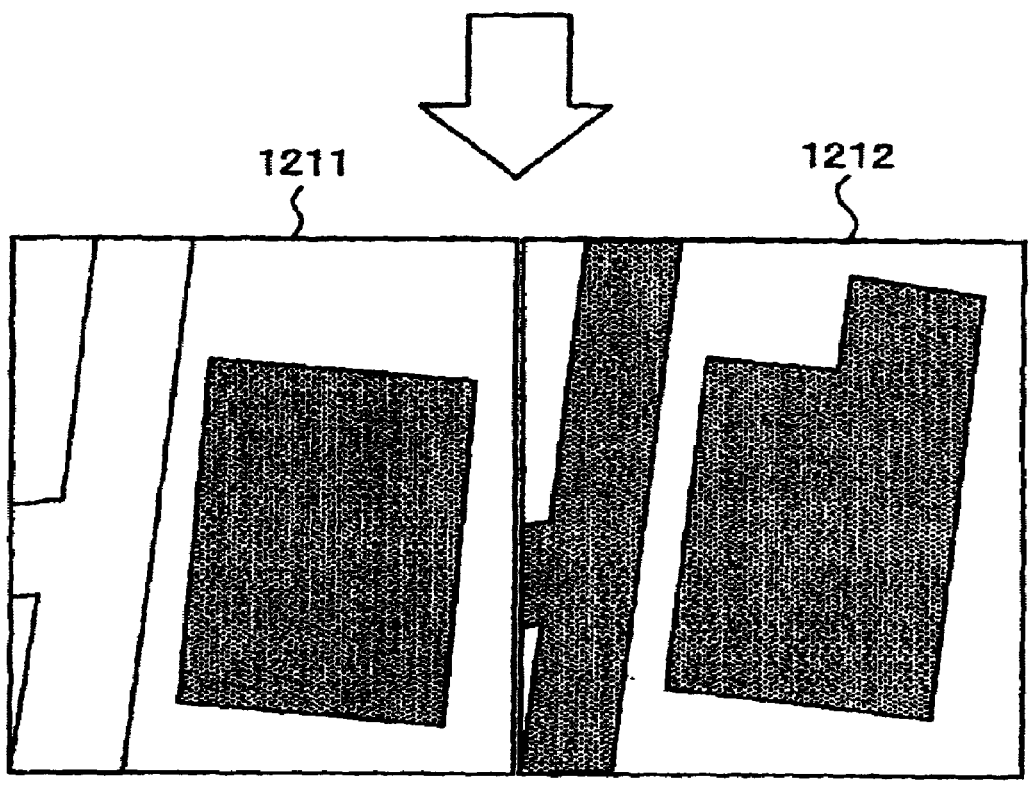

FIG. 10 is a view showing a state in which, in the adjacent display as shown in FIG. 5, a reference display area 1001 and a detection target display area 1002 are scrolled vertically and horizontally so as to be displayed like a reference display area 1011 and a detection target display area 1012 respectively. FIG. 11 is a view showing a state in which, in the adjacent display as shown in FIG. 5, a reference display area 1101 and a detection target display area 1102 are rotated so as to be displayed as a reference display area 1111 and a detection target display area 1112 respectively. FIG. 12 is a view showing a state in which, in the adjacent display as shown in FIG. 5, a reference display area 1201 and a detection target display area 1202 are scaled up so as to be displayed like a reference display area 1211 and a detection target display area 1212 respectively.

Further, only one of the line drawing and the image may be scrolled, or the color tone or brightness of the line drawing map or the image may be changed. By the display modes as described above, human confirmation operation can be made easily, efficiently and visualizably.

Returning to FIG. 2 again, in Step 205, if visual confirmation is not required, judgment is made as to whether a variation between the ground object areas is present or absent. If conclusion is made that a variation is present, the confirmation result is regarded as variation presence so as to be recorded in the confirmation result storage unit 104 by the confirmation result recording means 115 in Step 207.

In Step 206, on the basis of the detection result displayed in Step 204, the operator judges whether variation presence is confirmed or not. If variation presence is confirmed, the confirmation result is regarded as variation presence so as to be recorded in the confirmation result storage unit 104 by the confirmation result recording means 115 in Step 207. On the other hand, if the operator concludes that the variation is absent, the routine of process is terminated directly.

In Step 208, judgment as to whether the reference line drawing is updated or not is made in accordance with an instruction. If the reference line drawing is instructed to be updated, the routine of process goes to Step 209. On the other hand, if it is instructed not to be updated, the routine of process goes to Step 210. In Step 209, the line drawing is edited and updated by a line drawing editing means 112. By the line drawing editing means 112, variation detection is classified into new ground object, varied ground object, extinct ground object, on-the-spot investigation requiring ground object (ground object which needs on-the-spot investigation), and so on, and displayed and expressed in a form in which these classifications can be distinguished from each other visually on the display unit. Thus, the state of editing work can be grasped intuitively. In the updating of the ground object line drawing, manual updating, semi-automatic updating, automatic updating, and so on, are prepared. In the semi-automatic updating, the characteristic point of the image expressing the ground object shape of the ground object area can be designated manually so that the image expressing the ground object shape can be read automatically. The automatic updating is applied to such a case that the shape of the ground object area can be acquired accurately because visual confirmation is not required on the basis of variation detection and so on. When the on-the-spot investigation is required for updating, information showing a requirement for on-the-spot investigation is stored in the confirmation result storage unit 104 and displayed in accordance with the classifications made by the line drawing editing means 112.

In Step 210, judgment as to whether the variation detecting information is outputted or not is made in accordance with an instruction. If the variation detecting information is instructed to be outputted, the routine of process goes to Step 211. On the other hand, if it is instructed not to be outputted, the routine of process is terminated. In Step 211, information about the detection result, the confirmation result, the reference line drawing, the detection target image and so on is outputted to an output destination designated in advance and in an output method designated in advance, through the variation detecting information input/output unit 108 by the confirmation result outputting means 116. For example, such information is outputted directly to a printer, outputted to a recording medium, outputted to a portable terminal, or transmitted to the Internet or the like. When the variation detecting information outputted to the portable terminal or the like is updated as the latest information in accordance with the on-the-spot investigation or the like, the latest information may be fed back to the variation detecting apparatus 100 through the variation detecting information input/output unit 108, and stored in the confirmation result storage unit 104 or the line drawing/image storage unit 101.

Incidentally, the judgment in Step 208 and the judgment in Step 210 may be made by the operator, or made automatically in accordance with a judgment criterion of how to process the judgment set in advance.

The present invention can be realized by an apparatus in which predetermined software is installed in a computer. For example, the apparatus shown in FIG. 1 can be realized by installing predetermined software into a general purpose computer for realizing the processing means 110 to 117.

Figure 13:
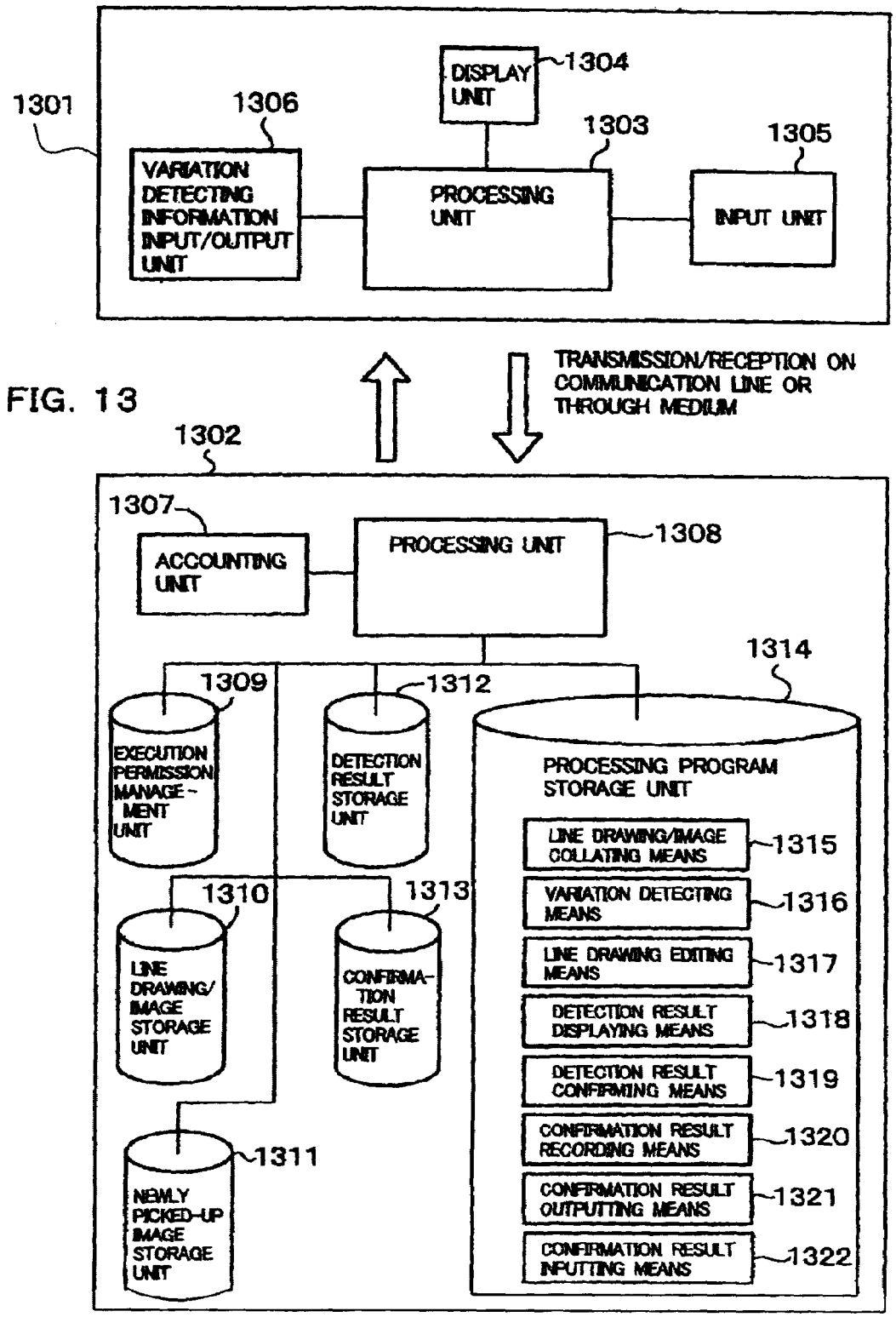
FIG. 13 is a diagram of a system configuration showing an embodiment of a variation detecting system to which the present invention is applied.

FIG. 13 is a diagram of a system configuration showing an embodiment of a system in which variations between ground objects can be distributed among and detected by a plurality of variation detecting apparatuses.

The system according to the embodiment is constituted by a plurality of variation detecting apparatuses 1301 and a center apparatus 1302. Incidentally, in order to simplify the description here, only one variation detecting apparatus is shown in FIG. 13. Further, the variation detecting apparatus 1301, or the center apparatus 1302 may be designed to be the position to execute processing programs. Here, in order to simplify the description, description will be made only about the case where the variation detecting apparatus 1301 executes the processing programs.

The variation detecting apparatus 1301 is constituted by a processing unit 1303, a display unit 1304, an input unit 1305, and a variation detecting information input/output unit 1306. The variation detecting apparatus 1301 corresponds to a user terminal or a client terminal. For example, the variation detecting apparatus 1301 may be constituted by a general purpose portable personal computer. When the variation detecting apparatus 1301 is constituted by a portable personal computer, an operator can go to the location of the ground object where a variation is recognized, and update the reference line drawing at the spot of investigation in accordance with the on-the-spot investigation result.

The center apparatus 1302 is constituted by an accounting unit 1307, a processing unit 1308, an execution permission management unit 1309, a line drawing/image storage unit 1310, a newly picked-up image storage unit 1311, a detection result storage unit 1312, a confirmation result storage unit 1313 and a processing program storage unit 1314.

The processing program storage unit 1314 stores, as programs, a line drawing/image collating means 1315, a variation detecting means 1316, a line drawing editing means 1317, a detection result displaying means 1318, a detection result confirming means 1319, a confirmation result recording means 1320, a confirmation result outputting means 1321, and a confirmation result inputting means 1322, respectively and correspondingly to the line drawing/image collating means 110, the variation detecting means 111, the line drawing editing means 112, the detection result displaying means 113, the detection result confirming means 114, the confirmation result recording means 115, the confirmation result outputting means 116 and the confirmation result inputting means 117 shown in FIG. 1.

In response to a request from the variation detecting apparatus 1301, the processing program storage unit 1314 can supply a part of or the whole of the programs corresponding to the above-mentioned means to the variation detecting apparatus 1301 issuing the request, on a communication line or through a medium.

In such a configuration, when a variation between ground objects is intended to be detected by the variation detecting apparatus 1301, the variation detecting apparatus 1301 issues a request to the center apparatus 1302 to acquire a part of or the whole of the processing programs from the processing program storage unit 1314 so as to acquire the part of or the whole of the processing programs on the communication line or through the medium. This step will be omitted if the part of or the whole of the processing programs have been already installed in the variation detecting apparatus 1301. In acquiring the part of or the whole of the processing programs, accounting may be made by the accounting unit 1307 in accordance with the content or quantity.

Further, the variation detecting apparatus 1301 issues a request to the center apparatus 1302 to acquire permission of executing the processing programs from the execution permission management unit 1309 so as to acquire the permission of executing the processing programs on the communication line or through the medium. This step will be omitted if the variation detecting apparatus 1301 already has the permission of executing the processing programs. In acquiring the permission of executing the processing programs, accounting may be made by the accounting unit 1307 in accordance with the content.

Further, the variation detecting apparatus 1301 issues a request to the center apparatus 1302 to acquire a line drawing or the image in a target region intended to be detected, from the line drawing/image storage unit 1310 or the newly picked-up image storage unit 1311 so as to acquire the line drawing or the image on the communication line or through the medium. This step will be omitted if the variation detecting apparatus 1301 already has the line drawing or the image in the target region. In acquiring the line drawing or the image, accounting may be made by the accounting unit 1307 in accordance with the content or quantity.

When it comes to the stage where all the requests are fulfilled completely, the variation detecting apparatus 1301 executes the processing programs and obtains an execution result. The result is fed back to the center apparatus 1302 again on the communication line or through the medium.

The updated data fed back thus is stored as latest information in the detection result storage unit 1312 or the confirmation result storage unit 1313 in accordance with the content of the updated data or presence/absence of the update authorization.

Figure 14:
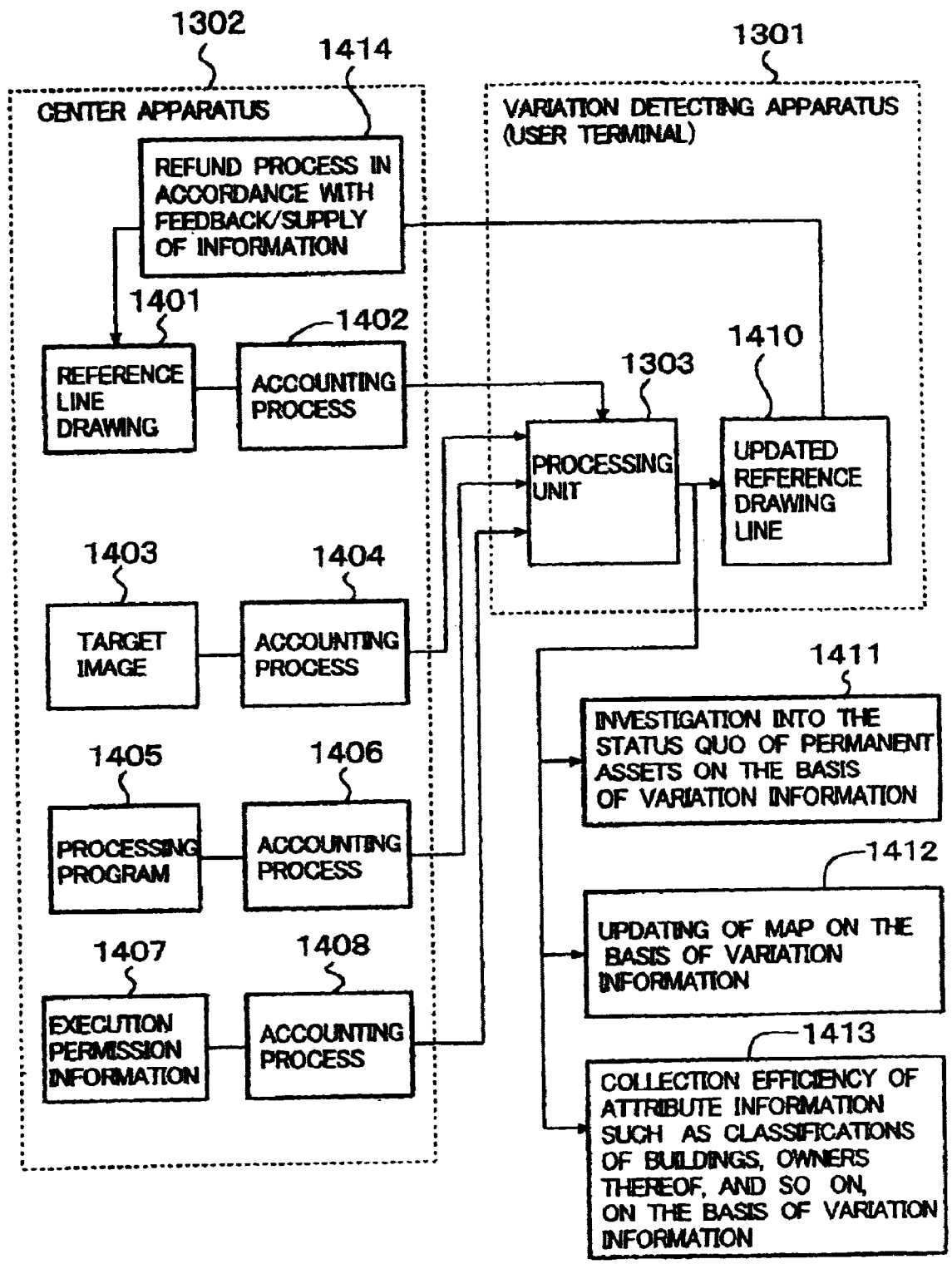
FIG. 14 is a diagram showing an example of how to utilize input/output information of a variation detecting apparatus regressively.

FIG. 14 is a view showing an example of how to utilize input/output information of the variation detecting apparatus 1301 regressively. The center apparatus 1302 transmits various kinds of image data, processing programs, and so on, in response to requests from the variation detecting apparatus 1301. When a reference line drawing 1401 is requested, the reference line drawing 1401 is transmitted to the variation detecting apparatus 1301 through an accounting process 1402 for the reference line drawing. When a target image 1403 is requested, the target image 1403 is transmitted to the variation detecting apparatus 1301 through an accounting process 1404 for the target image.

Further, when a processing program 1405 (any one of the processing programs stored in the processing program storage unit 1314) is requested, the processing program 1405 is transmitted to the variation detecting apparatus 1301 through an accounting process 1406 for the processing program. When execution permission information 1407 is requested, the execution permission information 1407 is transmitted to the variation detecting apparatus 1301 through an accounting process 1408 for the execution permission information. In accordance with the transmission contents or the data quantities through the accounting processes 1402, 1404, 1406 and 1408, classification of the user using the variation detecting apparatus 1301, and so on, accounting is made to charge a use fee.

In the variation detecting apparatus 1301, the received reference line drawing 1401, the received target image 1403, and the received processing program 1405 are inputted to the processing unit 1303, and processed in accordance with the execution permission information 1407 received likewise. An updated reference line drawing 1410 obtained by execution of the detection process is fed back to the center apparatus 1302 on the communication line or through the medium. In the feedback, a reduction on royalty or accounting is carried out in accordance with the fed back information content or quantity by a refund process 1414 carried out in accordance with the fed back or supplied information. If the reduction is not carried out, a reward payment procedure corresponding to a data update fee is carried out.

When the updated reference line drawing 1410 is fed back from the variation detecting apparatus 1301 to the center apparatus 1302, the center apparatus 1302 stores the updated reference line drawing 1410, as the latest reference line drawing 1401, in the detection result storage unit 1312 or the confirmation result storage unit 1313.

Hence, the center apparatus 1302 can always ensure the latest reference line drawing information and supply it to users of other line drawing detecting apparatuses or computers.

Further, when the variation detecting apparatus 1301 supplies the updated reference line drawing, as image data enhanced in value added, to the center apparatus 1302, the variation detecting apparatus 1301 receives a reward corresponding to the update fee, gets a reduction on accounting, or gets a royalty payment to the user. In such a manner, the variation detecting apparatus 1301 and the center apparatus 1302 can mutually enjoy economic benefits in the process of updating the reference line drawing.

Incidentally, the execution permission information 1407 may be dispensed with except the executable period of the processing program limited in advance (so-called outright sale of the program).

Figure 15:
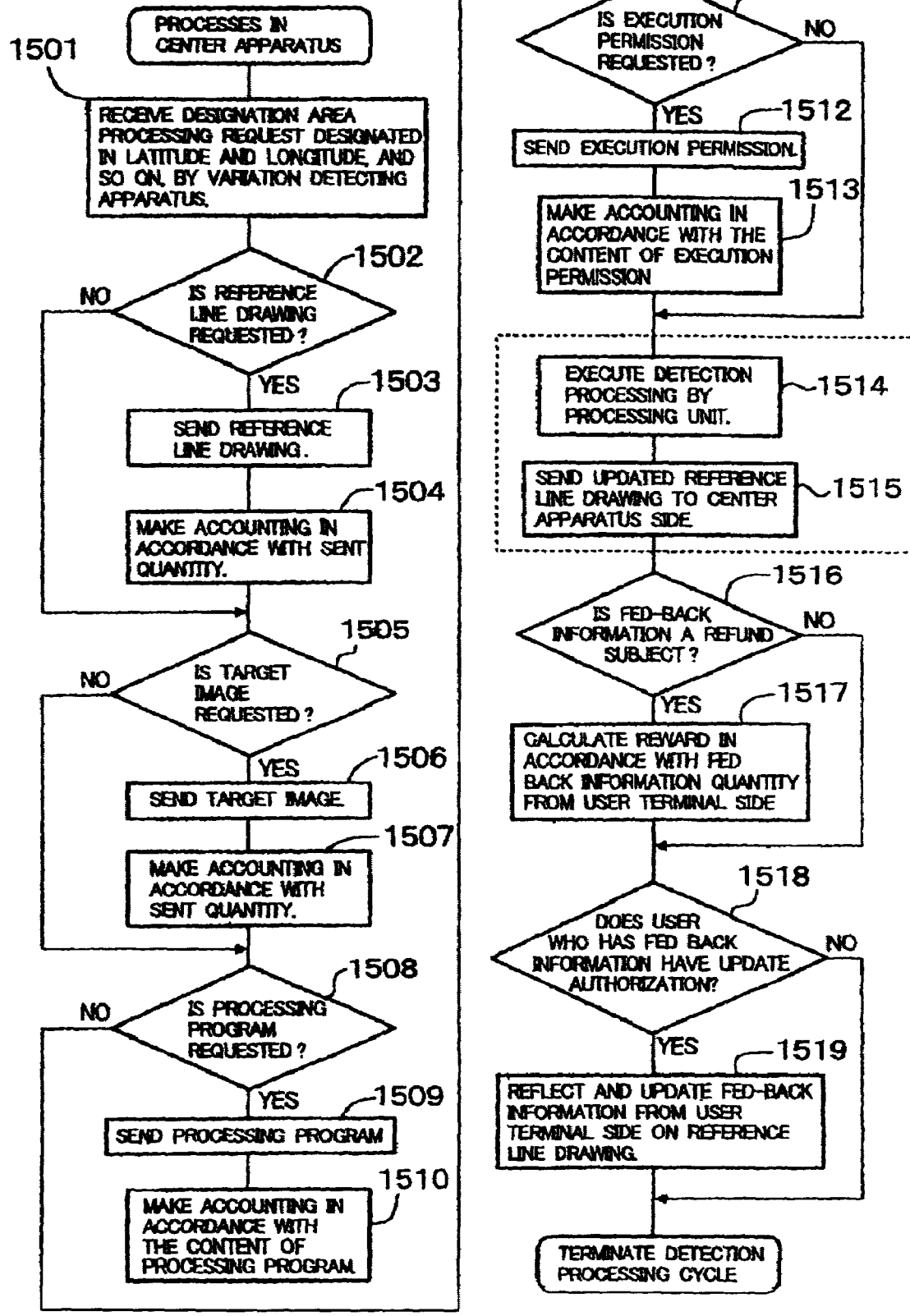
FIG. 15 is a schematic flow chart showing information exchange between a center apparatus and the variation detecting apparatus.
Figures 16A, 16B, 16C:
FIGS. 16A to 16C are views showing screen examples for specifying a range for a reference line drawing and a target image when a variation between ground objects is detected by the variation detecting apparatus.

FIG. 15 is a schematic flow chart showing information exchange between a center apparatus 1302 and a variation detecting apparatus 1301. FIGS. 16A to 16C show screen examples for specifying a range for a reference line drawing and a target image when a variation between ground objects is detected by the variation detecting apparatus 1301.

In FIG. 15, the center apparatus 1302 is in a request queuing state from the variation detecting apparatus 1301. When the center apparatus 1302 receives a designation range processing request designated in latitude, longitude and so on from any one of the variation detecting apparatuses on a communication line (Step 1501), the center apparatus 1302 judges that the request content is a reference line drawing request, a target image request, a processing program request, or an execution permission information request (Steps 1502, 1505, 1508 or 1511).

Here, in the variation detecting apparatus 1301, when the required range for the reference line drawing or the target image is designated in latitude and longitude, the latitude range and the longitude range are designated on a latitude/longitude range designating screen 1601 as shown in FIG. 16A. Further, when the required range of the reference line drawing or the target image is designated by a place name, the place name is designated on a place name designating screen 1602 as shown in FIG. 16B.

Further, when the variation detecting apparatus 1301 has already held the map information, the required range (heavy solid line frame) on a map of a range designating screen 1603 as shown in FIG. 16C can be designated by mouse operation.

When the request content is a reference line drawing or a target image, the reference line drawing or the target image in the range designated by the request is read from the line drawing/image storage unit 1310 or the newly picked-up image storage unit 1311 and sent to the destination where the request has been issued (Step 1503 or 1506). Accounting for the use fee in accordance with the sent quantity is made (Step 1504 or 1507).

Further, when the content request is a processing program, the designated processing program is read from the processing program storage unit 1314 and sent to the destination where the request has been issued (Step 1509). Accounting for the use fee in accordance with the content of the program or the data quantity is made (Step 1510).

Further, when the content request is execution permission information, the execution permission information of the designated processing program is acquired from the execution permission management unit 1309 and sent to the destination where the request has been issued (Step 1512). Accounting for the use fee in accordance with the execution permission information content is made (Step 1513).

In the variation detecting apparatus 1301, if the program and image data required for detecting a variation between ground objects are collected completely, a process for detecting a variation between the ground objects in the concerned region is carried out by use of the program and image data (Step 1514). When variation absence cannot be recognized obviously, a person in charge is instructed to make on-the-spot investigation to update the reference line drawing.

Figure 17A:
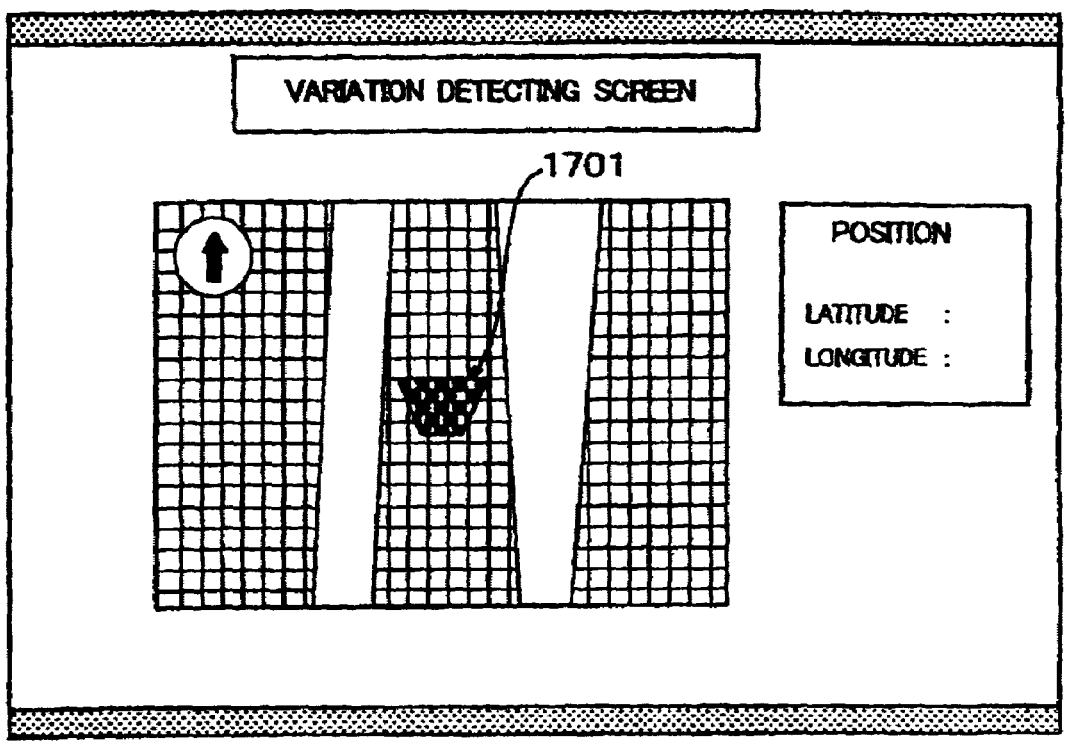
FIGS. 17A and 17B are graphs showing screen examples for updating the reference line drawing when the variation between the ground objects is detected.
Figure 17B:
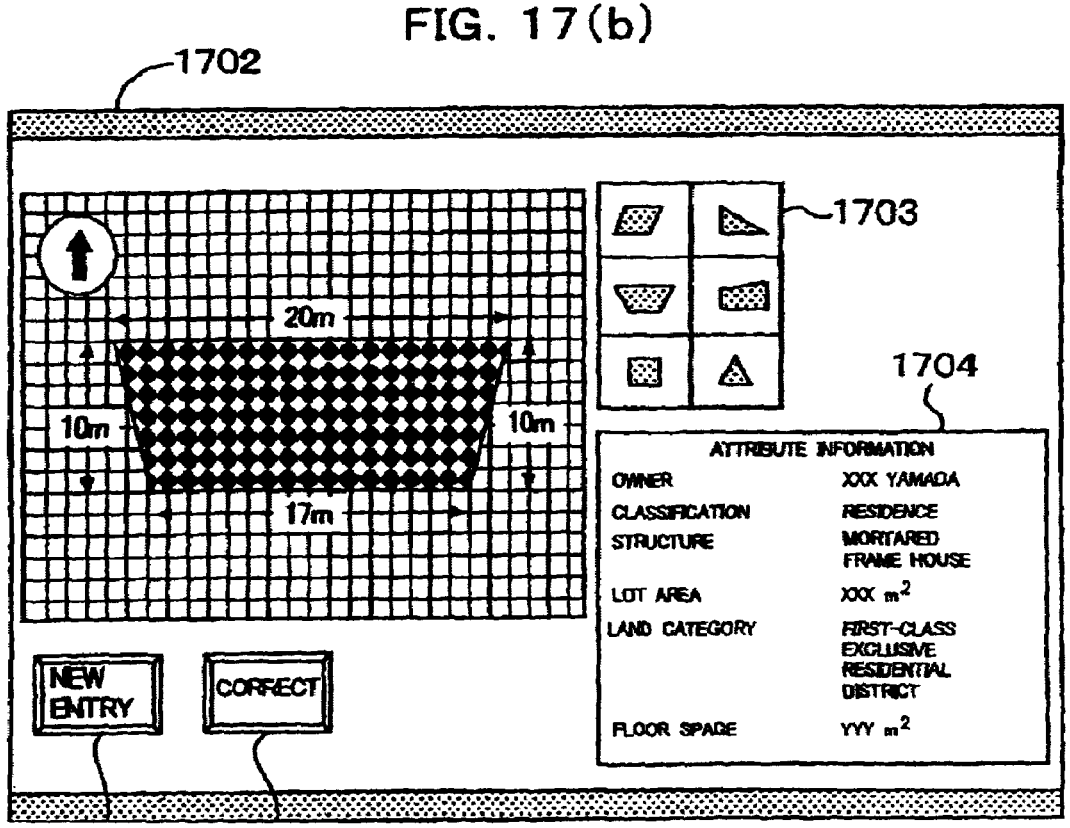

For example, when presence of a new building 1701 is detected on the reference line drawing in the region shown in FIG. 17A, owner, land category, classification, structure, lot area, and floor space of the building are acquired by the on-the-spot investigation, and a projected plan graph of the building is drawn, by use of a template 1703, on the reference line drawing of the update screen 2 as shown in FIG. 17B, so that the reference line drawing is updated. At the same time, the attribute information of the building such as the owner and so on is inputted on an attribute inputting screen 1704 so that the attribution information in addition to the updated image data of the reference line drawing are sent to the center apparatus 1302 (Step 1515). Here, "send" means transfer on a communication line, through a recording medium, or by other means.

Incidentally, on the screen in FIG. 17B, a "correct" button 1705 and a "new entry" button 1706 are provided so that the existing ground object can be corrected after operation of the "correct" button 1705. When a new ground object is inputted newly, a projected plan graph or attribute information is inputted after operation of the "new entry" button 1706.

In the center apparatus 1302, if the updated reference line drawing is received on the communication line or through the recording medium, judgment is made as to whether the fed back information (updated reference line drawing) is a refund subject or not, that is, as to whether the fed back information is a reward payment subject corresponding to an update fee (Step 1516). When the fed back information is the payment subject, a reward in accordance with the content of the updated data or the data quantity will be calculated on the basis of a fee table, so that a payment procedure or a process of making a reduction on the use fee for the program and so on is carried out (Step 1517).

Here, as to the reward to be paid for the updated reference line drawing, there are a method of making an arrangement on the reward every region, a method of determining the reward in accordance with whether to be a update worker making a contract with the manager of the center apparatus 1302, and so on. In addition, the amount per se may be set in accordance with the difficulty or the spent cost of the on-the-spot investigation in the urban region and the mountain region.

Next, the center apparatus 1302 judges whether the user feeding back the updated reference line drawing is authorized to update or not (Step 1518). When the feedback comes from the user having update authorization, the center apparatus 1302 updates the reference line drawing in the line drawing/image storage unit 1310 in order to reflect the real reference line drawing in the concerned region (Step 1519).

When the feedback comes from the user having no update authorization, the center apparatus 1302 stores the feedback in the confirmation result storage unit 1313 temporarily. After making confirmation that the user has the update authorization, the center apparatus 1302 updates the reference line drawing in the line drawing/image storage unit 1310.

The updated information of the reference line drawing obtained as described above is utilized, for example, for statue quo investigation by the local government on the permanent assets, or the like; for updating of a map created by a map maker, or a map created by an electrical power corporation, a telephone corporation, or the like, for the purpose of management of customers; for efficient collection of information limited to attribute information of buildings, for example, the building classification such as a frame building, RC, and so on, number of floors, owner, and so on.

Incidentally, the present invention is not limited to the embodiments but may be carried out with some suitable modifications.

[Effect of the Invention]

As described above, according to the present invention, when a map and an image is collated with each other and a detection result is updated, a variation part can be selectively displayed so that a part to be confirmed as a variation detecting part can be distinguished from the other part intuitively. The detection result displayed thus is combined with human assistance based on visual judgment so as to confirm or update the displayed detection result efficiently. Thus, problems in the related art such as misjudged variation detection due to automatic updating, ambiguous variation detection incapable of being judged automatically can be coped with easily and surely. As a result, a work to grasp and update the latest situation by comparing the existing information with the new image, such as an updating work of a ground object-marked map, for example, an urban planning map, an updating work of a street map utilized for a car navigation system or the like, a work for grasping and investigating the status quo of the house or the like can be carried out efficiently.

What is claimed is:

1. A variation detecting apparatus for detecting variations in ground objects in one and the same area between a line drawing map describing profile lines of said ground objects or an image obtained by picking up said ground objects from above (hereinafter referred to as "reference line drawing/image") and an image obtained by picking up said ground objects in the same area from above later on (hereinafter referred to as "target image"), comprising:

means for collating said reference line drawing/image with said target image so as to obtain variation indexes indicating whether there are variations or not in said ground objects respectively;

means for displaying ground objects which can be judged to have variations or ground objects which cannot be judged as to whether there are variations or not on the basis of said variation indexes, for visual confirmation for variation in a display mode in which an area of said reference line drawing/image including said ground objects and an area of said target image including said ground objects can be compared with each other; and means for storing ground objects judged to have variations by said visual confirmation for variation and ground objects which do not have to be subjected to said visual confirmation for variation but which can be judged to have variations on the basis of said variation indexes, as ground objects whose confirmation results are regarded as variation present.

2. A variation detecting apparatus according to claim 1, wherein:

when there are a plurality of ground objects which can be judged to have variations or ground objects which cannot be judged as to whether there are variations or not, areas including said ground objects are displayed sequentially automatically or manually.

3. A variation detecting apparatus according to claim 2, further comprising:

means for manually changing a display sequence changing display period when display is performed while the display sequence is changed every predetermined time automatically.

4. A variation detecting apparatus for detecting variations in ground objects in one and the same area between a line drawing map describing profile lines of said ground objects or an image obtained by picking up said ground objects from above (hereinafter referred to as "reference line drawing/image") and an image obtained by picking up said wound objects in the same area from above later on (hereinafter referred to as "target image"), comprising:

means for collating said reference line drawing/image with said target image so as to obtain variation indexes indicating whether there are variations or not in said ground objects respectively;

means for displaying ground objects which can be judged to have variations or ground objects which cannot be judged as to whether there are variations or not on the basis of said variation indexes, for visual confirmation for variation in a display mode in which an area of said reference line drawing/image including said ground objects and an area of said target image including said ground objects can be compared with each other; and means for storing ground objects judged to have variations by said visual confirmation for variation and ground objects which do not have to be subjected to said visual confirmation for variation but which can be judged to have variations on the basis of said variation indexes, as ground objects whose confirmation results are regarded as variation present; wherein said variation indexes are probabilities with which it can be concluded that there are variations, and probabilities with which it can be concluded that there is no variation; and ground objects in which said probabilities with which it can be concluded that there are variations are not lower than a predetermined value are regarded as ground objects which can be judged to have variations, while ground objects in which said probabilities with which it can be concluded that there are variations are not higher than a predetermined value or ground objects in which said probabilities with which it can be concluded that there is no variation are not higher than a predetermined value are regarded as ground objects which cannot be judged as to whether there are variations or not.

5. A variation detecting apparatus according to claim 1 or 4, wherein:

in said display mode in which an area of said reference line drawing/image including said ground objects and an area of said target image including said ground objects can be compared with each other, said areas are displayed in overlap with each other or placed adjacently to each other.

6. A variation detecting apparatus according to claim 5, further comprising:

means by which an operator referring to said area of said reference line drawing/image including said ground objects and said area of said target image including said ground objects displayed by said displaying means inputs a judgement result as to whether there are variations in said ground objects or not.

7. A variation detecting apparatus according to claim 1 or 4, further comprising:

means by which an operator referring to said area of said reference line drawing/image including said ground objects and said area of said target image including said ground objects displayed by said displaying means inputs a judgement result as to whether there are variations in said ground objects or not.

8. A variation detecting apparatus for detecting variations in ground objects in one and the same area between a line drawing map describing profile lines of said ground objects or an image obtained by picking up said ground objects from above (hereinafter referred to as "reference line drawing/image") and an image obtained by picking up said ground objects in the same area from above later on (hereinafter referred to as "target image"), comprising:

means for collating said reference line drawing/image with said target image so as to obtain variation indexes indicating whether there are variations or not in said ground objects respectively;

means for displaying ground objects which can be judged to have variations or ground objects which cannot be judged as to whether there are variations or not on the basis of said variation indexes, for visual confirmation for variation in a display mode in which an area of said reference line drawing/image including said ground objects and an area of said target image including said ground objects can be compared with each other; and means for storing ground objects judged to have variations by said visual confirmation for variation and ground objects which do not have to be subjected to said visual confirmation for variation but which can be judged to have variations on the basis of said variation indexes, as ground objects whose confirmation results are regarded as variation present; wherein:

said variation indexes are probabilities with which it can be concluded that there are variations, and probabilities with which it can be concluded that there is no variation;

ground objects in which said probabilities with which it can be concluded that there are variations are not lower than a predetermined value are regarded as ground objects which can be judged to have variations, while ground objects in which said probabilities with which it can be concluded that there are variations are not higher than a predetermined value or ground objects in which said probabilities with which it can be concluded that there is no variation are not higher than a predetermined value are regarded as ground objects which cannot be judged as to whether there are variations or not; and when said area of said reference line drawing/image including said ground objects and said area of said target image including said ground objects are displayed in overlap with each other, said respective areas to be displayed are switched every period of predetermined time automatically or manually.

9. A variation detecting apparatus according to claim 8, further comprising:

means for manually changing said switching display period.

10. A variation detecting apparatus for detecting variations in ground objects in one and the same area between a line drawing map describing profile lines of said ground objects or an image obtained by picking up said ground objects from above (hereinafter referred to as "reference line drawing/image") and an image obtained by picking up said ground objects in the same area from above later on (hereinafter referred to as "target image"), comprising:

means for collating said reference line drawing/image with said target image so as to obtain variation indexes indicating whether there are variations or not in said ground objects respectively;

means for displaying ground objects which can be judged to have variations or ground objects which cannot be judged as to whether there are variations or not on the basis of said variation indexes, for visual confirmation for variation in a display mode in which an area of said reference line drawing/image including said ground objects and an area of said target image including said ground objects can be compared with each other; and means for storing ground objects judged to have variations by said visual confirmation for variation and ground objects which do not have to be subjected to said visual confirmation for variation but which can be judged to have variations on the basis of said variation indexes, as ground objects whose confirmation results are regarded as variation present; wherein:

said variation indexes are probabilities with which it can be concluded that there are variations, and probabilities with which it can be concluded that there is no variation;

ground objects in which said probabilities with which it can be concluded that there are variations are not lower than a predetermined value are regarded as ground objects which can be judged to have variations, while ground objects in which said probabilities with which it can be concluded that there are variations are not higher than a predetermined value or ground objects in which said probabilities with which it can be concluded that there is no variation are not higher than a predetermined value are regarded as ground objects which cannot be judged as to whether there are variations or not; and when said area of said reference line drawing/image including said ground objects and said area of said target image including said ground objects are displayed in overlap with each other, the upper one of said respective areas is displayed in a predetermined transparent state so that the lower area can be seen through said upper area, and said areas are displayed while said transparent state is switched every a period of predetermined time automatically or manually.

11. A variation detecting apparatus according to claim 10, further comprising:

means for manually setting said switching period with which said transparent state is changed automatically every predetermined time.

12. A variation detecting apparatus for detecting variations in ground objects in one and the same area between a line drawing map describing profile lines of said ground objects or an image obtained by picking up said ground objects from above (hereinafter referred to as "reference line drawing/image") and an image obtained by picking up said ground objects in the same area from above later on (hereinafter referred to as "target image"), comprising:

means for collating said reference line drawing/image with said target image so as to obtain variation indexes indicating whether there are variations or not in said ground objects respectively;

means for displaying ground objects which can be judged to have variations or ground objects which cannot be judged as to whether there are variations or not on the basis of said variation indexes, for visual confirmation for variation in a display mode in which an area of said reference line drawing/image including said ground objects and an area of said target image including said ground objects can be compared with each other; and means for storing ground objects judged to have variations by said visual confirmation for variation and ground objects which do not have to be subjected to said visual confirmation for variation but which can be judged to have variations on the basis of said variation indexes, as ground objects whose confirmation results are regarded as variation present; wherein:

said variation indexes are probabilities with which it can be concluded that there are variations, and probabilities with which it can be concluded that there is no variation;

ground objects in which said probabilities with which it can be concluded that there are variations are not lower than a predetermined value are regarded as ground objects which can be judged to have variations, while ground objects in which said probabilities with which it can be concluded that there are variations are not higher than a predetermined value or ground objects in which said probabilities with which it can be concluded that there is no variation are not higher than a predetermined value are regarded as ground objects which cannot be judged as to whether there are variations or not; and when said area of said reference line drawing/image including said ground objects and said area of said target image including said ground objects are displayed in overlap with each other, an overlapped area is divided into a first area and a second area, and said area of said reference line drawing/image including said ground objects is displayed in said first area, while said area of said target image including said ground objects is displayed in said second area.

13. A variation detecting apparatus according to claim 12, wherein:

said first and second areas are two areas divided by one axis provided on said overlapped area or two areas divided by a biaxial rectangle provided on said overlapped area.

14. A variation detecting apparatus according to claim 12, wherein:

said first and second areas are transformed automatically or manually.

15. A variation detecting apparatus according to claim 14, further comprising:

means for manually changing a period of said transformation.

16. A variation detecting apparatus for detecting variations in ground objects in one and the same area between a line drawing map describing profile lines of said ground objects or an image obtained by picking up said ground objects from above (hereinafter referred to as "reference line drawing/image") and an image obtained by picking up said ground objects in the same area from above later on (hereinafter referred to as "target image"), comprising:

means for collating said reference line drawing/image with said target image so as to obtain variation indexes indicating whether there are variations or not in said ground objects respectively;

means for displaying &round objects which can be judged to have variations or ground objects which cannot be judged as to whether there are variations or not on the basis of said variation indexes, for visual confirmation for variation in a display mode in which an area of said reference line drawing/image including said ground objects and an area of said target image including said ground objects can be compared with each other; and means for storing ground objects judged to have variations by said visual confirmation for variation and ground objects which do not have to be subjected to said visual confirmation for variation but which can be judged to have variations on the basis of said variation indexes, as ground objects whose confirmation results are regarded as variation present; wherein:

said variation indexes are probabilities with which it can be concluded that there are variations, and probabilities with which it can be concluded that there is no variation;

ground objects in which said probabilities with which it can be concluded that there are variations are not lower than a predetermined value are regarded as ground objects which can be judged to have variations, while ground objects in which said probabilities with which it can be concluded that there are variations are not higher than a predetermined value or ground objects in which said probabilities with which it can be concluded that there is no variation are not higher than a predetermined value are regarded as wound objects which cannot be judged as to whether there are variations or not; and said variation detecting apparatus further comprises means for adjusting contrast of said area of said reference line drawing/image including said ground objects and contrast of said area of said target image including said ground objects so that a mean value of image pixel values is made to agree with a variance thereof in each of said areas when said areas are displayed in overlap with each other or placed adjacently to each other.

17. A variation detecting apparatus for detecting variations in ground objects in one and the same area between a line drawing map describing profile lines of said ground objects or an image obtained by picking up said ground objects from above (hereinafter referred to as "reference line drawing/image") and an image obtained by picking up said ground objects in the same area from above later on (hereinafter referred to as "target image"), comprising:

means for collating said reference line drawing/image with said target image so as to obtain variation indexes indicating whether there are variations or not in said ground objects respectively;

means for displaying ground objects which can be judged to have variations or ground objects which cannot be judged as to whether there are variations or not on the basis of said variation indexes, for visual confirmation for variation in a display mode in which an area of said reference line drawing/image including said ground objects and an area of said target image including said ground objects can be compared with each other; and means for storing ground objects judged to have variations by said visual confirmation for variation and ground objects which do not have to be subjected to said visual confirmation for variation but which can be judged to have variations on the basis of said variation indexes, as ground objects whose confirmation results are regarded as variation present; wherein:

said variation indexes are probabilities with which it can be concluded that there are variations, and probabilities with which it can be concluded that there is no variation;

ground objects in which said probabilities with which it can be concluded that there are variations are not lower than a predetermined value are regarded as ground objects which can be judged to have variations, while ground objects in which said probabilities with which it can be concluded that there are variations are not higher than a predetermined value or ground objects in which said probabilities with which it can be concluded that there is no variation are not higher than a predetermined value are regarded as ground objects which cannot be judged as to whether there are variations or not; and said variation detecting apparatus further comprises means for adjusting contrast of said area of said reference line drawing/image including said ground objects and contrast of said area of said target image including said ground objects so that brightnesses in two points specified in said areas are made to agree with each other while interpolation and extrapolation are carried out on any other point when said areas are displayed in overlap with each other or placed adjacently to each other.

18. A variation detecting method for detecting variations in ground objects in one and the same area between a line drawing map describing profile lines of said ground objects or an image obtained by picking up said ground objects (hereinafter referred to as "reference line drawing/image") from above and an image obtained by picking up said ground objects in the same area from above later on (hereinafter referred to as "target image"), comprising the steps of:

collating said reference line drawing/image with said target image so as to obtain variation indexes indicating whether there are variations or not in said ground objects respectively;

displaying ground objects which can be judged to have variations or ground objects which cannot be judged as to whether there are variations or not on the basis of said variation indexes, for visual confirmation for variation in a display mode in which an area of said reference line drawing/image including said ground objects and an area of said target image including said ground objects can be compared with each other; and storing ground objects judged to have variations by said visual confirmation for variation and ground objects which do not have to be subjected to said visual confirmation for variation but which can be judged to have variations on the basis of said variation indexes, as ground objects whose confirmation results are regarded as variation present.

19. A variation detecting method according to claim 18, wherein:

in said display mode in which an area of said reference line drawing/image including said ground objects and an area of said target image including said ground objects can be compared with each other, said areas are displayed in overlap with each other or placed adjacently to each other.

20. A variation detecting method for detecting variations in ground objects in one and the same area between a line drawing map describing profile lines of said ground objects or an image obtained by picking up said ground objects (hereinafter referred to as "reference line drawing/image") from above and an image obtained by picking up said ground objects in the same area from above later on (hereinafter referred to as "target image"), comprising the steps of:

collating said reference line drawing/image with said target image so as to obtain variation indexes indicating whether there are variations or not in said ground objects respectively;

displaying ground objects which can be judged to have variations or ground objects which cannot be judged as to whether there are variations or not on the basis of said variation indexes, for visual confirmation for variation in a display mode in which an area of said reference line drawing/image including said ground objects and an area of said target image including said ground objects can be compared with each other; and storing ground objects judged to have variations by said visual confirmation for variation and ground objects which do not have to be subjected to said visual confirmation for variation but which can be judged to have variations on the basis of said variation indexes, as ground objects whose confirmation results are regarded as variation present; wherein:

said variation indexes are probabilities with which it can be concluded that there are variations, and probabilities with which it can be concluded that there is no variation; and ground objects in which said probabilities with which it can be concluded that there are variations are not lower than a predetermined value are regarded as ground objects which can be judged to have variations, while ground objects in which said probabilities with which it can be concluded that there are variations are not higher than a predetermined value or ground objects in which said probabilities with which it can be concluded that there is no variation are not higher than a predetermined value are regarded as ground objects which cannot be judged as to whether there are variations or not.

21. A variation detecting method according to claim 20, wherein:
in said display mode in which an area of said reference line drawing/image including said ground objects and an area of said target image including said ground objects can be compared with each other, said areas are displayed in overlap with each other or placed adjacently to each other.

22. A variation detecting system comprising a variation detecting apparatus and a center apparatus, for detecting variations of ground objects between a reference line drawing/image composed of a line drawing/image describing profile lines of said ground objects or an image obtained by picking up said ground objects from above and a target image obtained by picking up said ground objects in the same area from above later on, said center apparatus including:
a storage unit for storing said reference line drawing/image and said target image; and
means for providing one or both of said reference line drawing/image and said target image stored in said storage unit to said variation detecting apparatus issuing a request, through a communication line or a medium in response to said request issued by said variation detecting apparatus;
said variation detecting apparatus including:
means for collating said reference line drawing/image with said target image so as to obtain variation indexes indicating whether there are variations or not in said ground objects respectively; and
means for displaying ground objects which can be judged to have variations or ground objects which cannot be judged as to whether there are variations or not on the basis of said variation indexes, in a display mode in which an area of said reference line drawing/image including said ground objects and an area of said target image including said ground objects can be compared with each other.

23. A variation detecting system according to claim 22, said center apparatus further including:
means for making accounting of a predetermined use fee whenever providing any one of said reference line drawing/image and said target image to said variation detecting apparatus issuing a request therefor.

24. A variation detecting system comprising a variation detecting apparatus and a center apparatus, for detecting variations of ground objects between a reference line drawing/image composed of a line drawing/image describing profile lines of said ground objects or an image obtained by picking up said ground objects from above and a target image obtained by picking up said ground objects in the same area from above later on, said center apparatus including:
a first storage unit for storing said reference line drawing/image and said target image;
a second storage unit for storing a processing program for detecting variations of ground objects;
means for providing one or both of said reference line drawing/image and said target image stored in said first storage unit to said variation detecting apparatus issuing a request, through a communication line or a medium in response to said request issued by said variation detecting apparatus; and
means for providing said processing program stored in said second storage unit to said variation detecting apparatus issuing a request, through a communication line or a medium in response to said request issued by said variation detecting apparatus;
said variation detecting apparatus including:
means for collating said reference line drawing/image with said target image on the basis of said reference line drawing/image, said target image and said processing program provided by said center apparatus so as to obtain variation indexes indicating whether there are variations or not in said ground objects respectively; and
means for displaying ground objects which can be judged to have variations or ground objects which cannot be judged as to whether there are variations or not on the basis of said variation indexes, in a display mode in which an area of said reference line drawing/image including said ground objects and an area of said target image including said ground objects can be compared with each other.

25. A variation detecting system according to claim 22 or 24, said center apparatus further including:
means for accepting, through a communication line or a medium, a reference line drawing/image updated according to a variation detection result in said variation detecting apparatus, and storing said updated reference line drawing/image into a third storage unit.

26. A variation detecting system according to claim 25, said center apparatus further including:
means for paying an update fee corresponding to an updated reference line drawing/image to a manager of said variation detecting apparatus providing said reference line drawing/image whenever receiving said reference line drawing/image from said variation detecting apparatus.

27. A variation detecting system according to claim 24, said center apparatus further including:
means for making accounting of a predetermined use fee whenever providing any one of said reference line drawing/image, said target image and said processing program to said variation detecting apparatus issuing a request therefor.

* * * * *